US012696311B2

(12) United States Patent
Hooli et al.

(10) Patent No.: US 12,696,311 B2
(45) Date of Patent: Jul. 28, 2026

(54) FLEXIBLE RESOURCE PARTITIONING FOR MULTI-HOP IAB ON UNLICENSED SPECTRUM BAND

(71) Applicant: Nokia Solutions and Networks Oy, Espoo (FI)

(72) Inventors: Kari Hooli, Oulu (FI); Esa Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 763 days.

(21) Appl. No.: 18/012,413

(22) PCT Filed: Jun. 23, 2020

(86) PCT No.: PCT/US2020/039047
§ 371 (c)(1),
(2) Date: Dec. 22, 2022

(87) PCT Pub. No.: WO2021/262146
PCT Pub. Date: Dec. 30, 2021

(65) Prior Publication Data
US 2023/0262759 A1      Aug. 17, 2023

(51) Int. Cl.
*H04W 74/0808* (2024.01)
*H04W 16/14* (2009.01)

(52) U.S. Cl.
CPC ....... *H04W 74/0808* (2013.01); *H04W 16/14* (2013.01)

(58) Field of Classification Search
CPC .......................... H04W 74/0808; H04W 16/14
See application file for complete search history.

(56) References Cited

U.S. PATENT DOCUMENTS

| | | | | |
|---|---|---|---|---|
| 2020/0145997 A1* | 5/2020 | Luo | ................... | H04W 72/0446 |
| 2022/0174735 A1* | 6/2022 | Li | ...................... | H04W 74/0816 |
| 2022/0225411 A1* | 7/2022 | Axnäs | ................... | H04L 1/0068 |

* cited by examiner

*Primary Examiner* — Ricky Q Ngo
*Assistant Examiner* — Stephen N Steiner
(74) *Attorney, Agent, or Firm* — Barta Jones, PLLC

(57) ABSTRACT

In a wireless system including multiple network nodes using unlicensed spectrum band(s) to communicate at least over backhaul, a configuration entity performs configuring first time resources to be used by at least a first one of the multiple network nodes for communications at least over backhaul using the unlicensed spectrum band(s). The first time resources have specific downlink resources. The configuration entity also performs configuring second time resources to be used by at least a second one of the multiple network nodes for communications at least over backhaul using the unlicensed spectrum band(s). The second time resources include resources for channel occupancy measurements that are at least within a time period set for the specific downlink resources of the first time resources. The first and second time resources overlap at least in part in time.

5 Claims, 16 Drawing Sheets

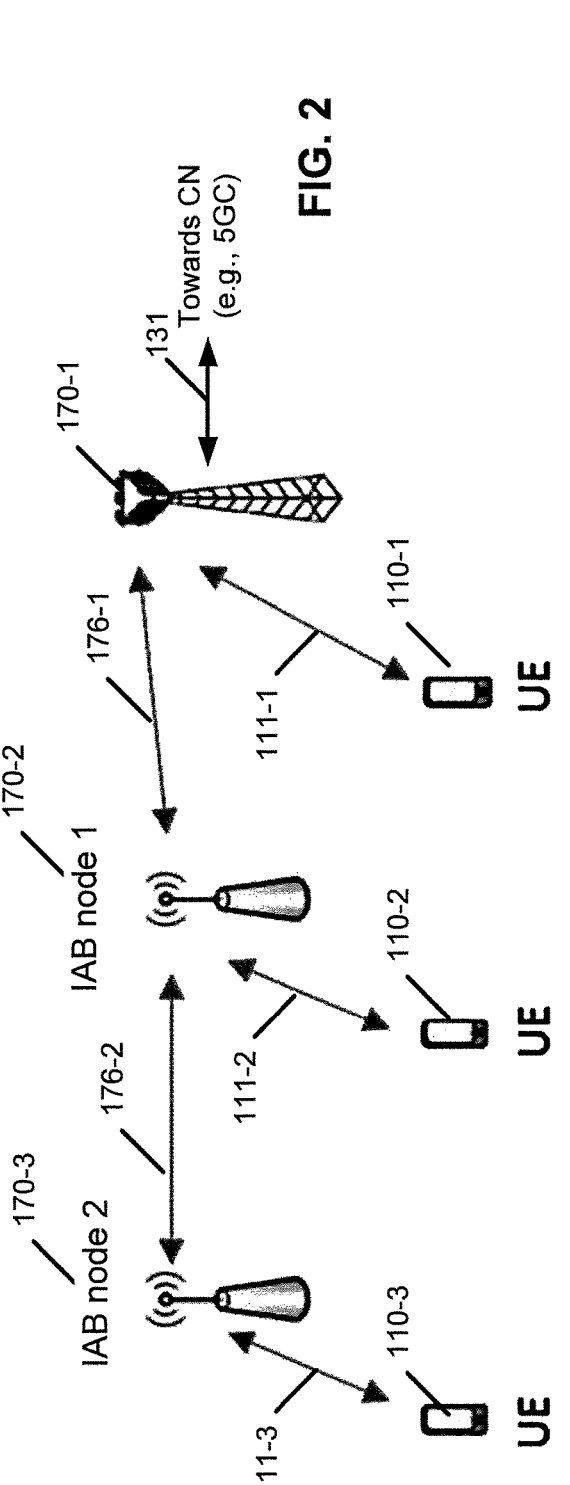

FIG. 2

Table 14.2: Mapping between values of *resourceAvailability* elements and types of soft symbol availability in a slot

| Value | Indication |
|---|---|
| 0 | No indication of availability for soft symbols |
| 1 | DL soft symbols are indicated available |
| 2 | No indication of availability for UL and Flexible soft symbols<br>UL soft symbols are indicated available<br>No indication of availability for DL and Flexible soft symbols |
| 3 | DL and UL soft symbols are indicated available<br>No indication of availability for Flexible soft symbols |
| 4 | Flexible soft symbols are indicated available<br>No indication of availability for DL and UL soft symbols |
| 5 | DL and Flexible soft symbols are indicated available<br>No indication of availability for UL soft symbols |
| 6 | UL and Flexible soft symbols are indicated available<br>No indication of availability for DL soft symbols |
| 7 | DL, UL, and Flexible soft symbols are indicated available |

FIG. 3

Phase 1: Backhaul DL    FIG. 4A

Phase 2: Access DL    FIG. 4B

Phase 3: Backhaul UL    FIG. 4C

Phase 4: Access UL    FIG. 4D

Donor gNB 170-1

IAB node 170-2

UE 110-2

1

FLEXIBLE RESOURCE PARTITIONING FOR MULTI-HOP IAB ON UNLICENSED SPECTRUM BAND

CROSS REFERENCE TO RELATED APPLICATION

This patent application is a U.S. National Stage application of International Patent Application Number PCT/US2020/039047 filed Jun. 23, 2020, which is hereby incorporated by reference in its entirety.

TECHNICAL FIELD

This invention relates generally to backhaul in wireless telecommunications networks and, more specifically, relates to wireless backhaul using unlicensed spectrum in wireless telecommunications networks.

BACKGROUND

In wireless telecommunications networks such as cellular networks, there are a number of network access nodes commonly referred to as base stations. The network access nodes allow a user equipment (UE) to access the network.

Recently, the base stations have been designated as RAN nodes, which can control a central unit (CU) and a number of distributed units (DUs). This allows the DUs to be physically distanced away from the CU but have a centralized point through which data is communicated.

These types of access nodes can communicate between each other using a backhaul (BH) link, which is typically wired and generally uses fiber. Lately, there has been a trend towards using wireless links as the BH links. In these systems, generally one node (a "donor" node) has a wired link to the backhaul, which also allows access to the core network of the telecommunications network. The donor node can contain the CU. The other nodes, which use wireless BH to the donor node or to other nodes, are referred to as integrated access and backhaul (IAB) nodes and may contain DUs. In other words, multiple IAB nodes can be connected to each other and one of the IAB nodes connects to the donor node via a wireless BH connection.

Each IAB node can connect one or more UEs to the telecommunications network via the wireless BH links and the donor node. Each IAB-to-IAB connection or donor-to-IAB is considered to be a hop. In a system where there is a donor node connected to a first IAB node that is itself connected to a second IAB node, there are two hops from the donor node to the second IAB donor node. Both hops are BH links. This is an example of a multi-hop situation. Note also that a UE has an access link to an IAB node, and this access link is also considered to be a hop. So, in the previous configuration where there are two IAB nodes and a donor node, a UE connected to the second IAB node would connect via an access link that is considered to be a third hop.

BRIEF SUMMARY

This section is intended to include examples and is not intended to be limiting.

In an exemplary embodiment, a method is disclosed that includes, in a wireless system comprising multiple network nodes using one or more unlicensed spectrum bands to communicate at least over backhaul, performing by a configuration entity in the wireless system the following. The method includes configuring first time resources to be used by at least a first one of the multiple network nodes for communications at least over backhaul using the one or more unlicensed spectrum bands. The first time resources have specific downlink resources. The method includes configuring second time resources to be used by at least a second one of the multiple network nodes for communications at least over backhaul using the one or more unlicensed spectrum bands. The second time resources comprise resources for channel occupancy measurements that are at least within a time period set for the specific downlink resources of the first time resources, and wherein the first and second time resources overlap at least in part in time.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: in a wireless system comprising multiple network nodes using one or more unlicensed spectrum bands to communicate at least over backhaul, performing by a configuration entity in the wireless system: configuring first time resources to be used by at least a first one of the multiple network nodes for communications at least over backhaul using the one or more unlicensed spectrum bands, the first time resources having specific downlink resources; and configuring second time resources to be used by at least a second one of the multiple network nodes for communications at least over backhaul using the one or more unlicensed spectrum bands, wherein the second time resources comprise resources for channel occupancy measurements that are at least within a time period set for the specific downlink resources of the first time resources, and wherein the first and second time resources overlap at least in part in time.

An exemplary computer program product includes a computer-readable storage medium bearing computer program code embodied therein for use with a computer. The computer program code includes: code for, in a wireless system comprising multiple network nodes using one or more unlicensed spectrum bands to communicate at least over backhaul, performing by a configuration entity in the wireless system: configuring first time resources to be used by at least a first one of the multiple network nodes for communications at least over backhaul using the one or more unlicensed spectrum bands, the first time resources having specific downlink resources; and configuring second time resources to be used by at least a second one of the multiple network nodes for communications at least over backhaul using the one or more unlicensed spectrum bands, wherein the second time resources comprise resources for channel occupancy measurements that are at least within a time period set for the specific downlink resources of the first time resources, and wherein the first and second time resources overlap at least in part in time.

In another exemplary embodiment, an apparatus comprises means for performing: in a wireless system comprising multiple network nodes using one or more unlicensed spectrum bands to communicate at least over backhaul, performing by a configuration entity in the wireless system: configuring first time resources to be used by at least a first one of the multiple network nodes for communications at least over backhaul using the one or more unlicensed spectrum bands, the first time resources having specific downlink resources; and configuring second time resources to be used by at least a second one of the multiple network nodes for communications at least over backhaul using the one or more unlicensed spectrum bands, wherein the second time resources comprise resources for channel occupancy measurements that are at least within a time period set for the specific downlink resources of the first time resources, and wherein the first and second time resources overlap at least in part in time.

In an exemplary embodiment, a method is disclosed that includes accessing, by a network node in a wireless network, configuration of second time resources to be used by for communications at least over backhaul with one or more other network nodes and using one or more unlicensed spectrum bands. The second time resources comprise resources for channel occupancy measurements that are at least within a time period set for specific downlink resources of first time resources for use by the one or more other network nodes, and wherein the first and second time resources overlap at least in part in time. The method also includes using the configuration of the second time resources to communicate using the one or more unlicensed spectrum bands at least over the backhaul.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: accessing, by a network node in a wireless network, configuration of second time resources to be used by for communications at least over backhaul with one or more other network nodes and using one or more unlicensed spectrum bands, wherein the second time resources comprise resources for channel occupancy measurements that are at least within a time period set for specific downlink resources of first time resources for use by the one or more other network nodes, and wherein the first and second time resources overlap at least in part in time; and using the configuration of the second time resources to communicate using the one or more unlicensed spectrum bands at least over the backhaul An exemplary computer program product includes a computer-readable storage medium bearing computer program code embodied therein for use with a computer. The computer program code includes: code for accessing, by a network node in a wireless network, configuration of second time resources to be used by for communications at least over backhaul with one or more other network nodes and using one or more unlicensed spectrum bands, wherein the second time resources comprise resources for channel occupancy measurements that are at least within a time period set for specific downlink resources of first time resources for use by the one or more other network nodes, and wherein the first and second time resources overlap at least in part in time; and code for using the configuration of the second time resources to communicate using the one or more unlicensed spectrum bands at least over the backhaul In another exemplary embodiment, an apparatus comprises means for performing: accessing, by a network node in a wireless network, configuration of second time resources to be used by for communications at least over backhaul with one or more other network nodes and using one or more unlicensed spectrum bands, wherein the second time resources comprise resources for channel occupancy measurements that are at least within a time period set for specific downlink resources of first time resources for use by the one or more other network nodes, and wherein the first and second time resources overlap at least in part in time; and using the configuration of the second time resources to communicate using the one or more unlicensed spectrum bands at least over the backhaul.

BRIEF DESCRIPTION OF THE DRAWINGS

In the attached Drawing Figures:

FIG. 2 is an exemplary illustration of Rel-16 NR IAB operation, in IAB deployments, where the traffic from IAB nodes is wirelessly backhauled between the IAB node and IAB donor, or another IAB node, using an established backhaul (BH) network topology;

FIG. 3 is a table, Table 14.2, illustrating mapping between values of resourceAvailability elements and types of soft symbol availability in a slot;

DETAILED DESCRIPTION OF THE DRAWINGS

Figure 1:
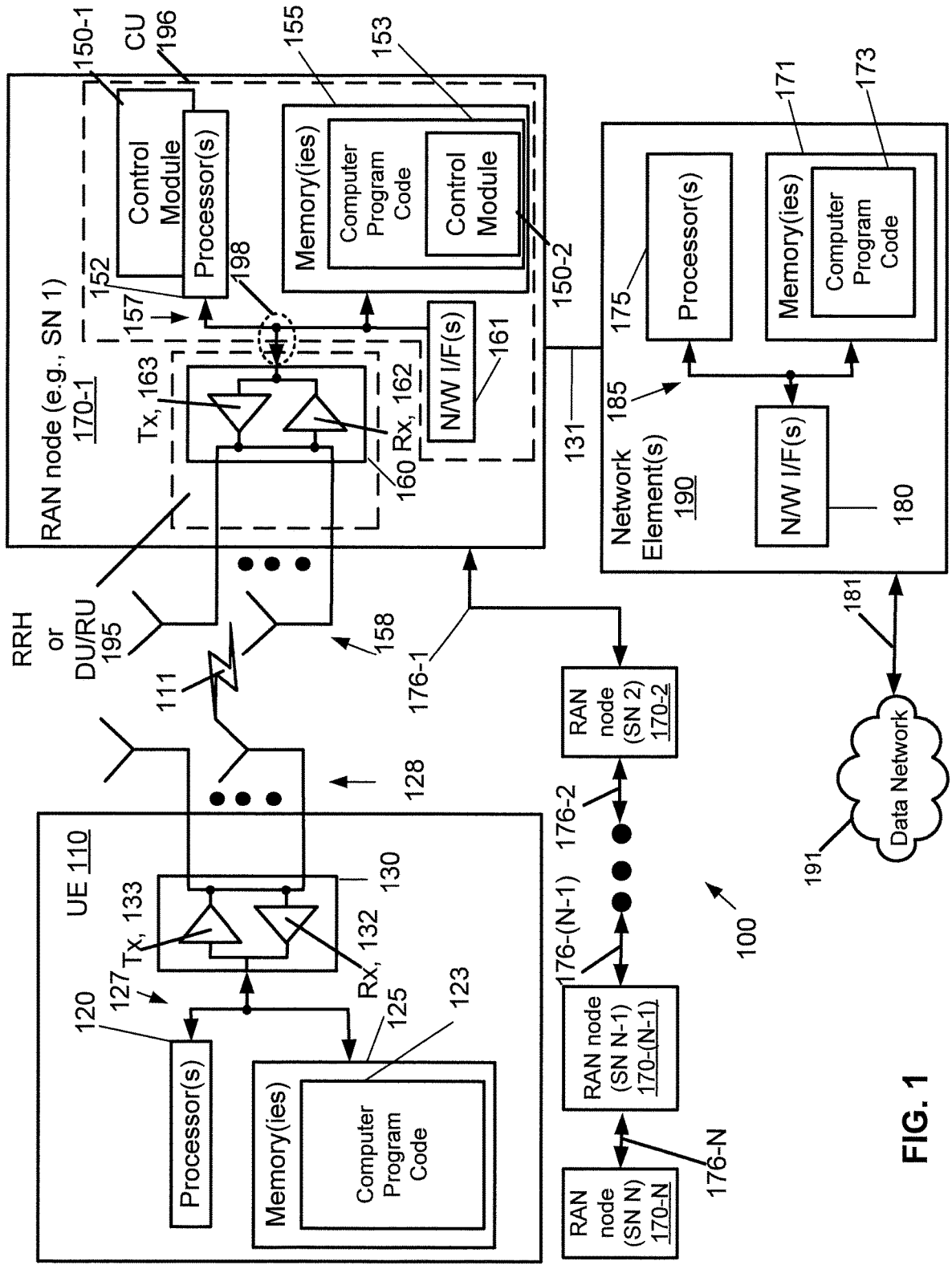
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for flexible resource partitioning for multi-hop IAB on unlicensed spectrum band. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170-1, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123.

The one or more memories 125 and the computer program code 123 may be configured to, with the one or more processors 120, cause the user equipment 110 to perform one or more of the operations as described herein. The UE 110 communicates with RAN node 170-1 via a wireless link 111.

The RAN node 170-1 is a base station that provides access by wireless devices such as the UE 110 to the wireless network 100. A number of RAN nodes 170 are shown. In this example, there are N RAN nodes 170. Each of these may be a scheduling node (SN), such that there are N SNs shown. There are connected through links 176, which in the case of the SNs 2 to N are wireless BH links. This is described in more detail below.

The RAN nodes 170 are considered to be similar, and therefore only the circuitry only in RAN node 170-1 is described. In the text below, the RAN nodes 170 are referred to as gNBs 170, but this is merely exemplary. The RAN node 170-1 may be, for instance, a base station for 5G, also called New Radio (NR). In 5G, the RAN node 170-1 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170-1 and centralized elements of the RAN node 170-1, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170-1 may also be an eNB (evolved NodeB) base station, for LTE (long term evolution), or any other suitable base station.

The RAN node 170-1 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170-1 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170-1 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., links 176. The RAN nodes 170 are considered to be scheduling nodes (SNs) 170 below, but this is exemplary. The links 176 may be wired or wireless or both and may implement, e.g., an Xn interface for 5G, an X2 interface for LTE, or other suitable interface for other standards. In the examples presented below, the links 176-1 through 176-N are wireless links used for BH, but it might be that a combination of wired and wireless links could be used. It is also noted that each link 176 is between each RAN node 170. That is, in certain exemplary embodiments, BH link 176-1 is between SN 1 170-1 and SN 2 170-2, BH link 176-2 is between SN 2 170-2 and SN 170-3, . . . , and BH link 70-N is between SN 170-(N−1) and SN 170-N. Thus, there is only one "leaf" node SN 170-N, nodes SN 170-(N−1) to 170-2 are branch nodes, and SN 170-1 is a root/trunk node. The topology could be more complex than this, for instance, including multiple leaves and corresponding branches.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170-1 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170-1 to the RRH/DU 195. Reference 198 also indicates those suitable network link(s).

While the elements 170 are shows in FIG. 1 (and other figures) as being RAN nodes, in exemplary embodiments an IAB operates according to a split architecture. Hence, there is at least one CU 196 and a number of DUs 195 in this type of considered system. All elements 170 may be referred to as base stations, such as being gNBs, which is the NR term for a base station. Additionally, in exemplary embodiments, the DU 195 part of an IAB node (e.g., one of 170-1 through 170-N) performs part of the gNB functionalities, and the remaining gNB functionalities are carried out by the CU 196 (e.g., 170-1). In addition to IAB nodes, there is at least one DU 195 in the system of base stations 170 having a wired backhaul connection. This is the donor CU, which may also be referred to as being or being part of a donor gNB (DgNB) 170-1 herein.

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LIE may include MME (Mobility Management Entity)/SGW (Serving Gateway) functionality. These are merely exemplary functions that may be supported by the network element(s) 190, and note that both 5G and LTE functions might be supported. The RAN node 170-1 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170-1, and other functions as described herein.

Having thus introduced one suitable but non-limiting technical context for the practice of the exemplary embodiments, the exemplary embodiments will now be described with greater specificity.

Exemplary embodiments herein relate to in-band relaying operations at 5 GHz and on possible 6 GHz unlicensed band, and on other applicable bands. In order to describe the exemplary improvements related herein, it is helpful to describe possible context for the improvements. For instance, both NR IAB and NR Unlicensed (NR-U) are relevant and exemplary technologies for the considered scenarios.

It is noted that unlicensed bands are bands that are not licensed by a licensed authority in a country or a group of countries. For instance, in the United States, the FCC (Federal Communications Commission) determines which bands are licensed or unlicensed. For unlicensed bands, organizations or individuals can still use the airwaves to transmit communications without getting permission from the FCC, but they must transmit within those parts of the spectrum that are designated for unlicensed users.

Considering NR-U IAB operation, IAB operation below 7 GHz unlicensed bands is not yet part of 3GPP discussions (it was shortlisted as a potential topic for further IAB enhancements during 3GPP Rel-17 preparations). In the following, the 3GPP status and background for these technologies are provided.

With respect to Rel-16 NR IAB operation, in IAB deployments, the traffic from IAB nodes is wirelessly backhauled between the IAB node and IAB donor, or another IAB node, using an established backhaul (BH) network topology. Turning to FIG. 2, an MB node 170-2 has BH link 176-1 towards corresponding parent node 170-1 and child link 176-2 towards IAB node 170-3, and IAB node 170-2 may also serve UEs with access links 111-2 as shown in FIG. 2. In FIG. 2, the parent of IAB node 1 170-2 is a donor node 170-1 that has a wired BH connection (e.g., link 131, which goes towards a CN, such as a 5GC), and IAB node 1 170-2 provides a backhaul connection 176-2 for its child IAB node 2 170-3. In addition, all the nodes may directly serve UEs 110. One UE 110-1, 110-2, or 110-3 is illustrated for each corresponding node 170-1, 170-2, or 170-3 and corresponding links 111-1, 111-2, or 111-3. In the system of FIG. 2, the IAB node 1 170-2 has the following links to support:

1) DL and UL for access UEs. These links are scheduled by IAB node 1 170-2.

2) Receiving DL Parent BH (over link 176-1) from the donor node 170-1 and transmitting UL parent BH (over link 176-1) to the donor node 170-1. These links are scheduled by the donor node 170-1.

3) Transmitting DL child BH (via link 176-2) to the child IAB node 2 170-3 and receiving UL child BH (via link 176-2) from the child IAB node 2 170-3. These links are scheduled by IAB node 1 170-2.

The Rel-16 IAB supports only TDM between access and backhaul. This can be seen as a feasible approach for operation for below 7 GHz bands, which is severely interference limited.

The following has been captured from 3GPP TR 38.874, see 3GPP TR 38.874 0.7.0 (2018-11), section 7.3.3, "Resource coordination":

From a IAB-node DU point-of-view, the child link has the following types of time resources:

Downlink time resource;
Uplink time resource;
Flexible time resource;

Not available time resources (resources not to be used for communication on the DU child links).

Each of the downlink, uplink and flexible time-resource types of the DU child link can belong to one of two categories:

Hard: The corresponding time resource is always available for the DU child link;

Soft: The availability of the corresponding time resource for the DU child link is explicitly and/or implicitly controlled by the parent node.

The IAB DU contains a number of symbols for DL, Flexible, and UL. Furthermore, resources are configured by higher layers as Hard, Soft or Not Available. For explicit control, Rel-16 specification supports an availability indicator (DCI Format 2_5). An IAB can adjust the soft symbols in a slot according to Table 14.2 (See 3GPP TS 38.213). Table 14.2 is illustrated in FIG. 3, illustrating mapping between values of resourceAvailability elements and types of soft symbol availability in a slot. For implicit determination, if an MT resource is occupied by parent BH link, this resource is not available for child links (and vice versa).

Considering now Rel-16 NR-U operation, in Rel-16, NR operation on unlicensed band was specified for below 7 GHz bands. One reason for the NR-U specific changes was fair spectrum sharing between various uncoordinated radio systems ensured via regulatory rules governing e.g., channel access, as follows.

1) The time a device or a node occupies a channel with a transmission is referred to as channel occupancy time (COT) and the maximum time of channel occupancy is regulated. Hence, the communication is comprised of transmission bursts. The node initiating channel occupancy may share the channel occupancy time with a responding node. In other words, a node has contended for the channel, and after the node has obtained access to the channel and started channel occupancy with transmission, this allows a responding node to use a portion of its channel occupancy time.

2) Prior to accessing the channel, the node needs to ensure that the channel is vacant. For this, a listen-before-talk (LBT) procedure is used. In NR-U, three channel access procedures are defined:

a) In Cat-4 channel access, a node performs LBT and generates a random number N uniformly distributed over a contention window (where the size of contention window depends on the channel access priority class of the traffic and whether a collision on channel access was detected earlier). Once the node has measured the channel to be vacant for N times, the node may occupy the channel with transmission. To align the transmission with slot boundary, the node may need to resort to self-deferral during the LBT procedure. Cat-4 LBT is used when a device initiates a channel occupancy.

b) In Cat-2 channel access, a node performs LBT with single channel measurement in time interval of 16 μs or 25 μs before transmission. A responding node sharing a channel occupancy initiated by another node may perform Cat-2 LBT prior to this node's transmission.

c) Cat-1 channel access may be used by a responding node sharing a channel occupancy initiated by another node. In Cat-1 channel access, the responding node does not perform any LBT, but the following transmission is restricted to be short (shorter than 584 μs) and the time gap between the transmissions by the channel occupancy initiating node and the responding node is at most 16 μs.

Rel-16 NR-U supports the use of unlicensed spectrum bands through various deployment scenarios, including the following:

1) By Licensed Assisted Access (LAA), where a UE is connected to the network through a carrier on an unlicensed spectrum as well as through a carrier on a licensed spectrum. Carrier aggregation or dual connectivity may be used.

2) Stand-alone deployment, where a UE is connected to the network solely through the unlicensed spectrum. This deployment scenario is attractive for private networks: e.g., networks owned and used by a private company, e.g., on a factory floor, in a warehouse, in a harbor, for agriculture, and the like.

NR-U cells have a limited coverage due to tight regulatory restrictions on maximum Tx power and effective isotropic radiated power (e.i.r.p.) on unlicensed spectrum. This can be a considerable problem for private networks, frequently deployed in environments with challenging radio propagation due to large metallic obstacles like machines or containers. Complete coverage with economical network deployment can be essential for private networks. On other hand, private networks cannot utilize the larger Tx power and wider coverage of a licensed spectrum carrier.

One exemplary problem considered herein is network coverage on the unlicensed spectrum in the case of stand-alone NR-U deployment, e.g., on private networks. Some of typical ways to improve network coverage include but are not limited to the following examples:

1) Increasing Tx power and/or e.i.r.p. This is not possible in the considered scenarios due to said regulatory limitations.

2) Using lower frequencies. When limited to the use of unlicensed spectrum, this would mean deployment of, e.g., long-range (LoRa) wireless IoT radio in parallel to NR-U. This is not attractive, due to low available data rates as well as due to deployment of two radio technologies in parallel.

3) Deploying more cells. This is a viable option. However, in some scenarios, it can be challenging or costly to provide the necessary wire line connection to the base station. For these scenarios, it is attractive to provide the backhaul connection for the gNBs with IAB also operating on unlicensed spectrum by use of NR-U, that is, NR-U IAB. It can be noted that multi-hop relaying needs to be part of an NR-U IAB solution.

Specifically for deploying more cells, currently there are no NR-U IAB solutions in place for below 7 GHz range. It can be noted that there is interest for relying or backhauling on 60 GHz unlicensed band e.g., due to vast amount of spectrum that is under used. However, as 60 GHz backhauling/relaying requires in practice line-of-sight connection, it requires careful network planning and is not well suited for private networks. It is expected that LBT-based channel access mechanism is not required for a fixed network equipment on 60 GHz unlicensed band.

A different issue is related to a considered NR-U IAB solution, and specifically flexible resource partitioning facilitating LBT. In this document, a half-duplex constraint is considered for an IAB node, which means that an IAB node cannot transmit and receive at the same time for this configuration. Furthermore, it is assumed that TDM is used as the multiplexing scheme between access and backhaul links. This indicates that there should be four separate time domain resources available to support four different links: BH DL, access DL, BH UL, access UL. This is illustrated by FIG. 4.

Figures 4, 6:
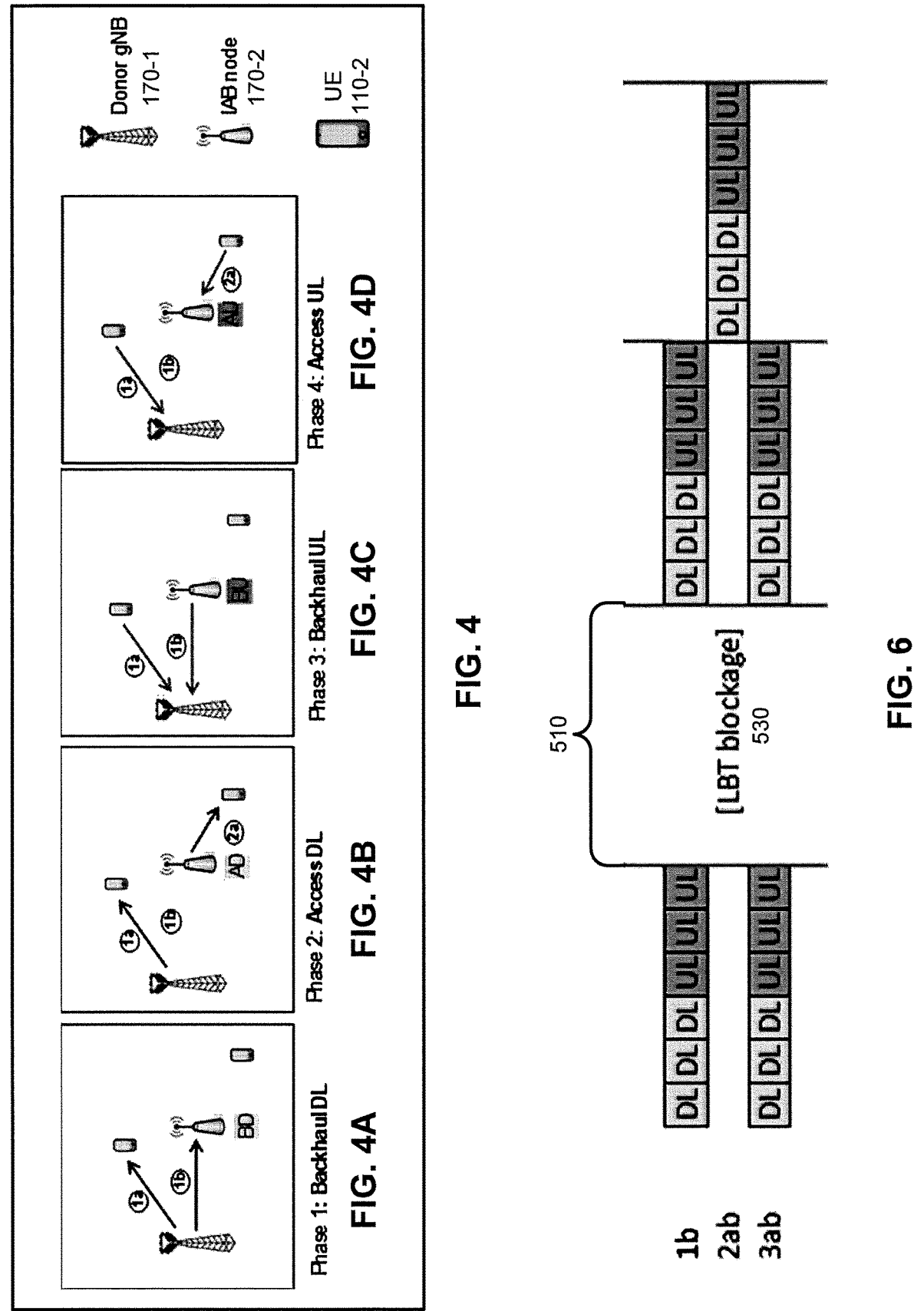
FIG. 4 is one exemplary considered scenario of TDM with half duplex, and includes FIG. 4A for a phase 1 for backhaul DL, FIG. 4B for a phase 2 for access DL, FIG. 4C for a phase 3 for backhaul UL, and a FIG. 4D for a phase 4 for access UL.
FIG. 6 is an illustration of LBT blockage and its impact, based on part of FIG. 5C.

FIG. 4 is one exemplary considered scenario of TDM with half duplex, and includes FIG. 4A for a phase 1 for backhaul DL, FIG. 4B for a phase 2 for access DL, FIG. 4C for a phase 3 for backhaul UL, and a FIG. 4D for a phase 4 for access UL. Possible operations are shown for the donor gNB (DgNB) 170-1, the IAB node 170-2 and corresponding UEs 110. In this example, 1a refers to an access link (e.g., 111) between a UE 110-2 (e.g., denoted "-2" because of the connection to IAB node 1 170-2) and the DgNB 170-1; 1b to a BH link (e.g., 176-1) between the DgNB 170-1 and the IAB node 1 170-2; and 2a refers to an access link (e.g., 111) between a UE 110-2 and the IAB node 170-2. In further detail, the numbers 1, 2, 3, . . . refer to the hop, the letter "a" refers to access for link 111 between a UE and a network node 170, and the letter "b" refers to backhaul for a link 76 between network nodes 170. This scheme for labeling the access and backhaul hops is used here and throughout this document and corresponding figures.

In phase 1 of FIG. 4A, the donor gNB (DgNB) 170-1 transmits (1a) data in DL to the UE and/or transmits (1b) over the BH link to the IAB node 170-2. This is the backhaul DL phase, BD. In phase 2 of FIG. 4B, the donor gNB 170-1 transmits (1a) data in DL to the UE, but there is no BH communication (1b is shown with no corresponding arrow). Instead, the IAB node 170-2 also transmits (2a) data to its UE. This is the access DL phase, AD. Phase 3 of FIG. 4C concerns UL from both the UE (1a) and the IAB node 170-2 (1b) to the donor gNB 170-1. This is the backhaul UL phase, BU. In phase 4 of FIG. 4D, the UE transmits (1a) to the donor gNB 170-1, but there is no BH communication (1b is shown with no corresponding arrow). Instead, the UE for the IAB node also transmits (2a) to the IAB node 170-2.

One exemplary problem considered here is how to support flexible resource partitioning between the nodes under partially conflicting requirements of the considered scenarios, as per the following.

1) Due to half-duplex TDD operation, Tx/Rx phases on different nodes (DgNB, IAB, UE) must be strictly coordinated (as seen in FIG. 4). Otherwise, the IAB node may not be able to listen to scheduling information from the DgNB. Further, the DgNB may not be able to listen to scheduling request information (such as a SR) from the IAB node.

2) Multi-hop communication will create further dependencies between different IAB nodes.

3) On the other hand, LBT and floating timing can create uncertainty for a starting time of channel occupancy time (COT).

For the starting time of COT, industrial private networks are frequently assumed to be deployed in controlled environments, without interfering transmissions, e.g., from WiFi, or with WiFi transmissions contained on certain channels of the unlicensed spectrum. However, this is not necessarily true in all cases and solutions should incorporate mechanisms mitigating the LBT impact.

In one exemplary embodiment herein, the resource partitioning should be dynamic yet in control of the donor gNB. The resource partitioning should support also multi-hop relaying, and the partitioning should make it possible to operate the IAB network without cross-link interference, yet the resources should be used efficiently, even under the impact of LBT delaying channel access. Cross link interference could happen e.g. in the scenario where UEs (including IAB-MT) and gNB (including IAB-DU) are transmitting at the same time.

Figures 5A, 5B, 5C:
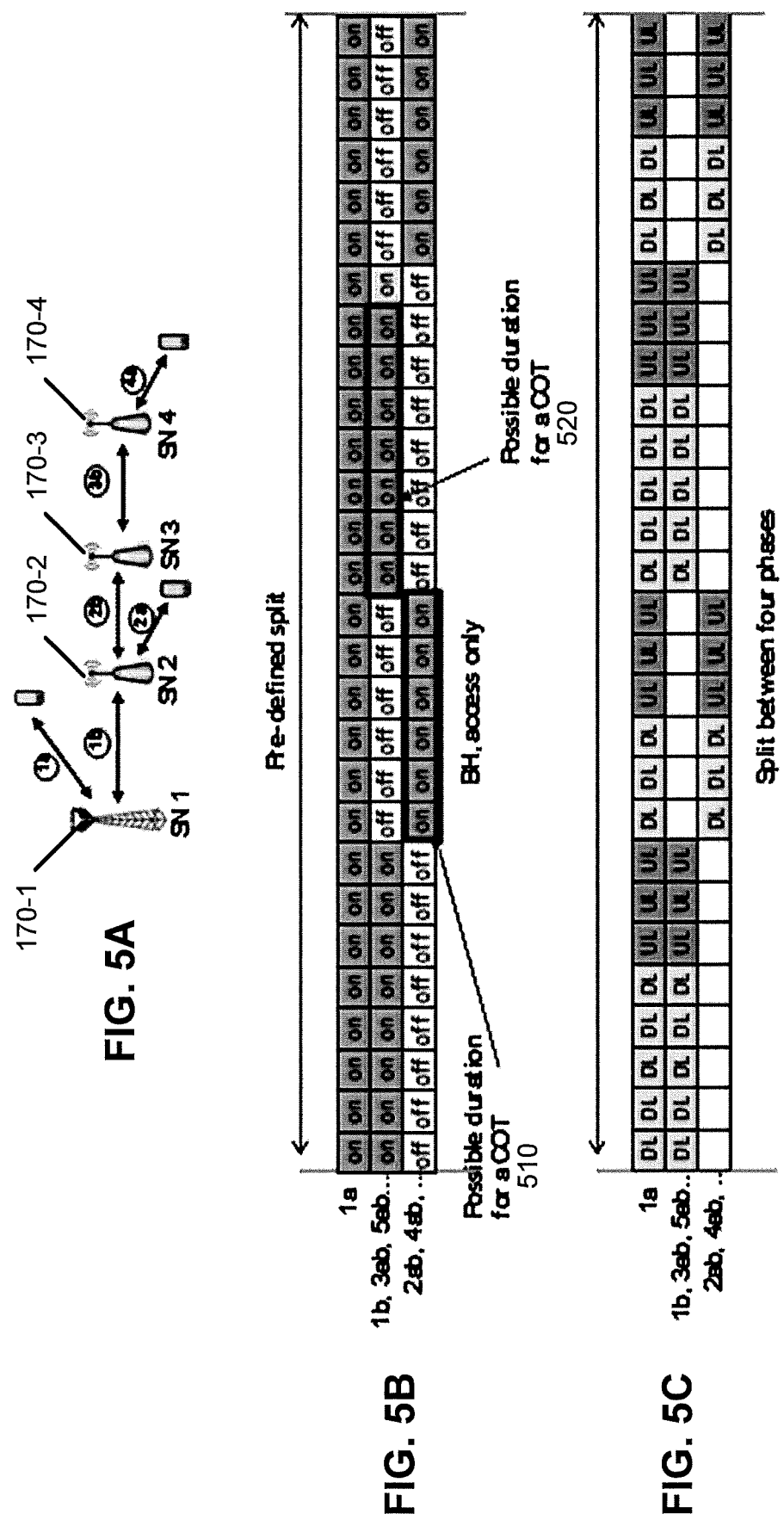
FIG. 5A is an exemplary system configuration for FIGS. 5B and 5C.
FIG. 5B is an exemplary resource usage defined in terms of backhaul and access link resources for at least the exemplary system configuration of FIG. 5A.
FIG. 5C is an exemplary resource usage defined in terms of BH/access split but also split between DL and UL portions of the COT by means of higher layer signaling for at least the exemplary system configuration of FIG. 5A.

Concerning resource partitioning for IAB on unlicensed spectrum consider the following, with the assumption of TDM between access and backhaul links. FIG. 5A is an exemplary system configuration for FIGS. 5B and 5C. In this system, there are four scheduling nodes (SNs): SN 1

170-1 (the DgNB); SN 2 170-2; SN 3 170-3; and SN 170-4. There are UEs 110 connected to all but the SN 170-3. FIG. 5B is an exemplary resource usage defined in terms of backhaul and access link resources for at least the exemplary system configuration of FIG. 5A. Meanwhile, FIG. 5C is an exemplary resource usage defined in terms of BH/access split but also split between DL and UL portions of the COT by means of higher layer signaling for at least the exemplary system configuration of FIG. 5A.

In the examples of FIGS. 5B and 5C, IAB nodes 170-2 through 170-4 are configured with predefined patterns, where one pattern defines resource usage for odd numbered hops (1b, 3ab, 5ab . . . ), and another pattern for even numbered hops (2ab, 4ab, . . . ). For instance, 1b is backhaul between the SNs 1 and 2 and 2b is between SNs 2 and 3. As another example, 4a is access by a UE to SN4. The two patterns are complementary to each other ("on"/"off"): when odd links are "on", even links are "off", and vice versa. Basically "on" corresponds to IAB access link resource being valid for the link. "On" resources can be defined also with more accurate SFI including e.g., link direction, reserved/flexible resources, etc. Each IAB node follows the pattern: COT acquired by the scheduling node should be confined within contiguous time domain resources defined by the corresponding access link ("on").

FIG. 5B shows a possible duration for a COT 510 for the odd-numbered hops and also a possible duration for a COT 520 for the even-numbered hops. FIG. 5C shows an example where DL portion and UL portion are split based on higher layer configuration. This approach may facilitate favorable conditions with respect to cross-link interference. When UL/DL split is used, then each scheduling node needs to follow this split when scheduling DL and UL signals/channels within the COT 510 or 520.

In this disclosure, this is taken as a base line. While this type of resource usage can avoid uncoordinated channel contention between nodes and/or cross-link interference, it can lead to inefficient overall use of resources and added delay when LBT blocks a link, as illustrated in FIG. 6. FIG. 6 is an illustration of LBT blockage and its impact, based on part of FIG. 5C. The LBT blockage 530 means that the SN 2 170-2 performed an LBT and another device was transmitting on the unlicensed spectrum. Thus, the possible duration for the COT 510 would be unused. This may lead to inefficient overall use of resources and added delay when LBT blocks the link for SN 2 170-2.

In the exemplary embodiments herein, additional flexibility is introduced to the IAB resource partitioning. The additional flexibility improves the overall usage of resources under the impact of LBT temporarily blocking channel access. First, an overview is provided, and then more details are provided.

As an overview, in exemplary arrangements, rules are introduced for the use of hard (e.g., first) time resources and soft (e.g., second) time resources, allowing a node to access channel on time resources primarily allocated for another IAB node, once the node detects that the other node has failed to obtain channel access. The additional flexibility may be achieved by means of "specific" soft time resources. Specific soft time resources (e.g., slots/symbols) may be configured, in addition to hard time/not available (NA) resources (e.g., slots/symbols), for IAB DU. Those can be indicated e.g., by higher layer configuration and/or slot format indication (such as DCI 2_5).

As one example, and as an overview, currently, the hard and soft types of resource relate to the RRC configuration of resources. In the case of hard resource, they are configured for IAB-DU use and that is it. In the case of soft resource, the use of resource (access link or parent backhaul link) is determined more dynamically, e.g. based on DCI format 2_5 signaling from parent node. By contrast for exemplary embodiments herein, the node with hard resources has priority to try channel access, and if the access fails, the node with soft resources has second priority to try the channel access. So, in a sense the (dynamic) availability of soft resource is determined based on channel sensing on specific time instances instead of earlier DCI signaling.

Concerning terminology, consider the following definitions:

IAB-DU: This is gNB-DU functionality supported by the IAB-node to terminate the NR access interface to UEs and next-hop IAB-nodes, and to terminate the F1 protocol to the gNB-CU functionality, on the IAB-donor.

IAB-MT: This is an IAB-node function that terminates the Uu interface to the parent node using the procedures and behaviors specified for UEs unless stated otherwise.

IAB-node: This is a RAN node that supports NR access links to UEs and NR backhaul links to parent nodes and child nodes. The IAB-node might not support backhauling via LTE.

Furthermore, in addition to the previous definitions of resources), the following definitions are used for resources herein:

A. Hard: The resource (e.g., slot/symbol) is available for access link/IAB-DU functionalities to use and control them (and thus not available for parent backhaul/IAB-MT at least in the TDM scenario unless IAB-DU fails to obtain channel access for them);

B. Not Available (NA) (also called unavailable): The resource (e.g., slot/symbol) is not available for access/IAB-DU (and thus they can be available for parent backhaul/IAB-MT also in the TDM scenario).

C. Soft: The symbol may be available for access link/IAB-DU or for parent backhaul (IAB-MT).

D. Access: Access resources are resources configured for IAB-DU. Those resources cover also child backhaul link(s), i.e. backhaul served by the IAB-DU, as well as link(s) used to serve UEs.

E. Backhaul: Backhaul resources are resources configured for IAB-MT (i.e. parent backhaul link).

Additionally, the terms "hard resources" and "hard time resources", and "soft resources" and "soft time resources" are considered to be the same herein. The hard time resources may also be referred to as first time resources, and the soft time resources may be referred to as second time resources, though this is merely exemplary.

As described in more detail, each hop has an access channel denoted as "a", a backhaul channel denoted as "b", and the hop count uses a number (e.g., 2a is access for the second hop).

Figure 17:
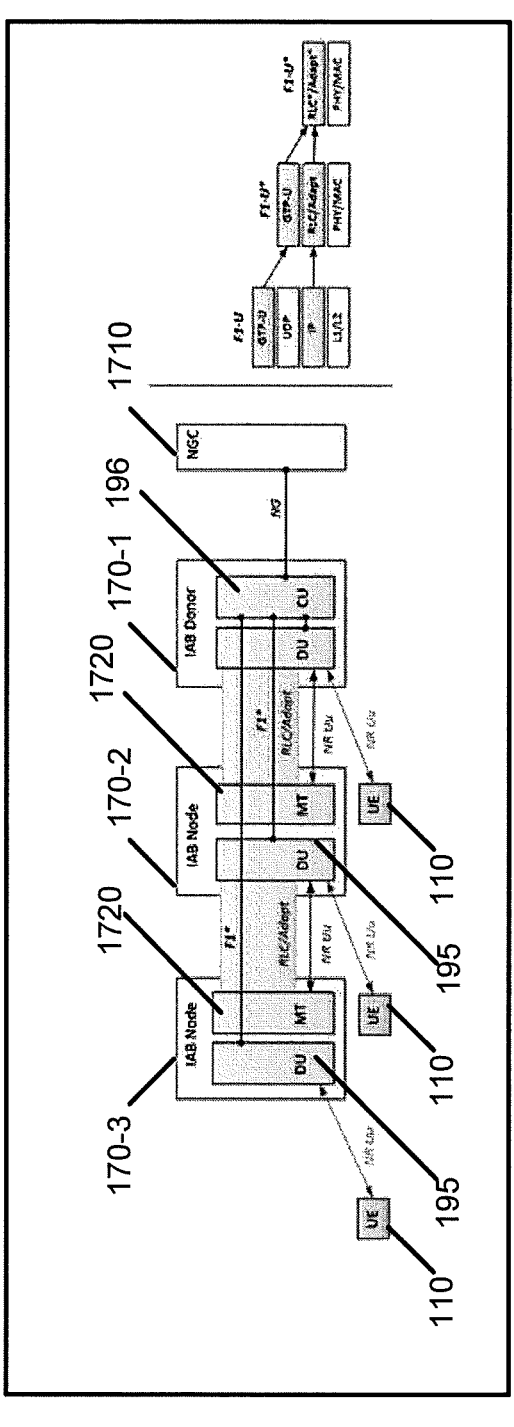
FIG. 17 illustrates a possible IAB architecture.

Turning briefly to FIG. 17, this figure illustrates a possible IAB architecture. This is an IAB architecture for architecture 1a, see 3GPP 1'R 38.874. In this example, each IAB node 170-1, 170-2, and 170-3 has a DU 195. The IAB donor node 170-1 has a CU 196, which connects to the NGC 1710, and the IAB nodes 170-2 and 170-3 have MT functionality 1720. It is seen that the NR Uu interface is between the IAB nodes and also between an IAB node 170 and a corresponding UE 110. The right side of the figures shows higher layers for the interfaces F1-U, Fi-U* and Fi-U*. The higher layer operation may be defined by the following:

1) The donor node 170-1 hosts the centralized unit (CU) 196 for all IAB nodes, i.e. the donor node runs RRC, higher L2 (e.g., PDCP) and control functions for the subtending IAB topology.

2) The CU 196 has two control interfaces to the IAB nodes, namely RRC connection to the IAB-MT and F1-interface to the IAB-DU.

3) Distributed units (DUs) 195 reside at the donor node 170-1 as well as at each IAB node (e.g., 170-2 and 170-3 in this example).

4) The DU 195 hosts lower L2 protocol layers (RLC, MAC) and the physical (PHY) layer As shown in the figure, the Uu is a physical layer interface (i.e. interface between UE and RAN). This emphasizes the fact that backhaul connection is operated "on top of" the existing Uu (PHY) interface, i.e., "using the procedures and behaviors specified for UEs unless stated otherwise". The means in practice that most of the PHY (physical layer) functionalities are the same for UE and IAB-MT. However, there are also some differences, e.g., UEs don't support DCI Format 2_5 (whereas IAB-MT supports this). With respect to equating IAB-MT and the serving DU in the parent BH scenario, this is true, since both are operating one end of the same Uu interface.

Figures 7, 8:
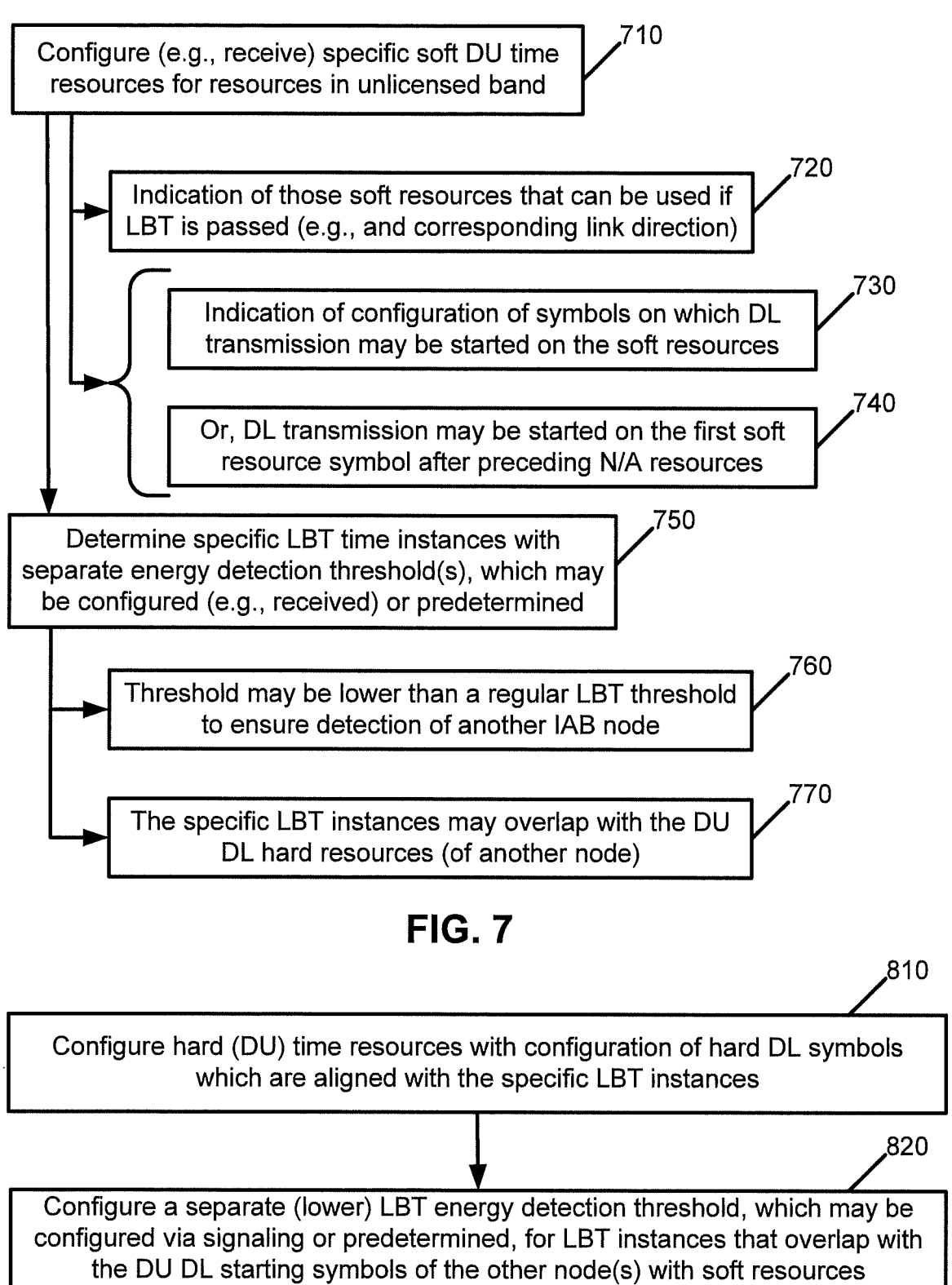
FIG. 7 is a logic flow diagram for configuring soft time resources for an IAB node, in accordance with an exemplary embodiment.
FIG. 8 is a logic flow diagram for configuring hard time resources for an IAB node, in accordance with an exemplary embodiment.

Turning to FIG. 7, this figure is a logic flow diagram for configuring soft time resources for an IAB node. This figure also illustrates the operation of an exemplary method or methods, a result of execution of computer program instructions embodied on a computer readable memory, functions performed by logic implemented in hardware, and/or interconnected means for performing functions in accordance with exemplary embodiments. FIG. 7 is primarily directed at an IAB-DU node 170 (e.g., 170-2 through 170-N, acting as a DU 195) or DgNB/Donor DU 170-1 or a CU 196), but may also be directed to an IAB-MT. In the description below, emphasis is placed on an IAB-DU, but the actions are also applicable to the IAB-MT.

An IAB node 170 may configure specific soft DU time resources for resources in the unlicensed band. For instance, information may be received, by the IAB-DU, and the configuration made via the information. See block 710 of FIG. 7. The configuration may have been made by the Control Unit (CU) (e.g., as part of the DgNB) and it may be signaled via F1-AP, for instance. As is known, the F1 interface is between a gNB-CU and a gNB-DU. The F1 interface may also be separated into F1-C and F1-U based on control plane and user plane functionalities, respectively. From the perspective of an IAB node 170, the soft DU time resources are received, but from the perspective of the CU 196 (e.g., a part of a DgNB 170-1), the CU 196 configures the IAB node 170 via signaling.

One example of block 710 is indication of those soft resources that can be used if LBT is passed. See block 720. Additionally, there may be indication of configuration that may contain link direction available for the resources (where direction is DL, UL, or Flexible). See also block 720. The IAB node (DU) may also receive indication of configuration of symbols on which DL transmission may be started on the soft resources. See block 730. Alternatively, it may be agreed that DL transmission may be started on the first soft resource symbol after preceding NA resources. See block 740. This supports only a single starting symbol per set of soft resources.

Additionally, the IAB node 170 may determine specific LBT time instances with separate energy detection threshold(s), which may be configured or predetermined. See block 750. The configuration may be received via signaling such as F1-AP (DU part), or RRC (MT part). In block 760, a threshold may be lower than a regular LBT threshold to ensure detection of another IAB node. In another example, block 770, the specific LBT instances may overlap with the DU DL hard resources (of another node). The instances in an exemplary embodiment can be predetermined to precede the symbols on which transmission may start.

While FIG. 7 is directed to configuring of soft (e.g., second) time resources, FIG. 8 is directed to configuring hard (e.g., first) time resources for an IAB node. As with FIG. 7, FIG. 8 is mainly directed to the IAB-DU and Donor gNB/DU but may also be directed to an IAB-MT. That is, an IAB node 170 (e.g., one of 170-2 to 170-N) might receive the configuration, e.g., via signaling, and the CU could perform the configuring via the signaling. It is noted that a CU is a logical entity and may be implemented by a donor gNB, though this is not necessary, and another element may implement the CU. Additionally, the CU typically serves multiple DUs (and may serve multiple donor gNBs). It is further noted that both FIGS. 7 and 8 may be performed by an IAB node 170, e.g., which can be configured with both soft and hard resources. FIG. 8 illustrates the operation of an exemplary method or methods, a result of execution of computer program instructions embodied on a computer readable memory, functions performed by logic implemented in hardware, and/or interconnected means for performing functions in accordance with exemplary embodiments. Another IAB node for another link (e.g., a parent node) configures hard (DU) time resources with configuration of hard DL resources (e.g., slots/symbols) which are time-aligned with the specific LBT instances discussed above. See block 810. This configuration may be received via signaling, e.g. via F1-AP signaling received from CU. Additionally, configuration (see block 820) of a separate (lower) LBT energy detection threshold may be configured via signaling or predetermined for LBT instances that overlap with the DU DL starting symbols of the other node(s) with soft resources.

Figure 9:
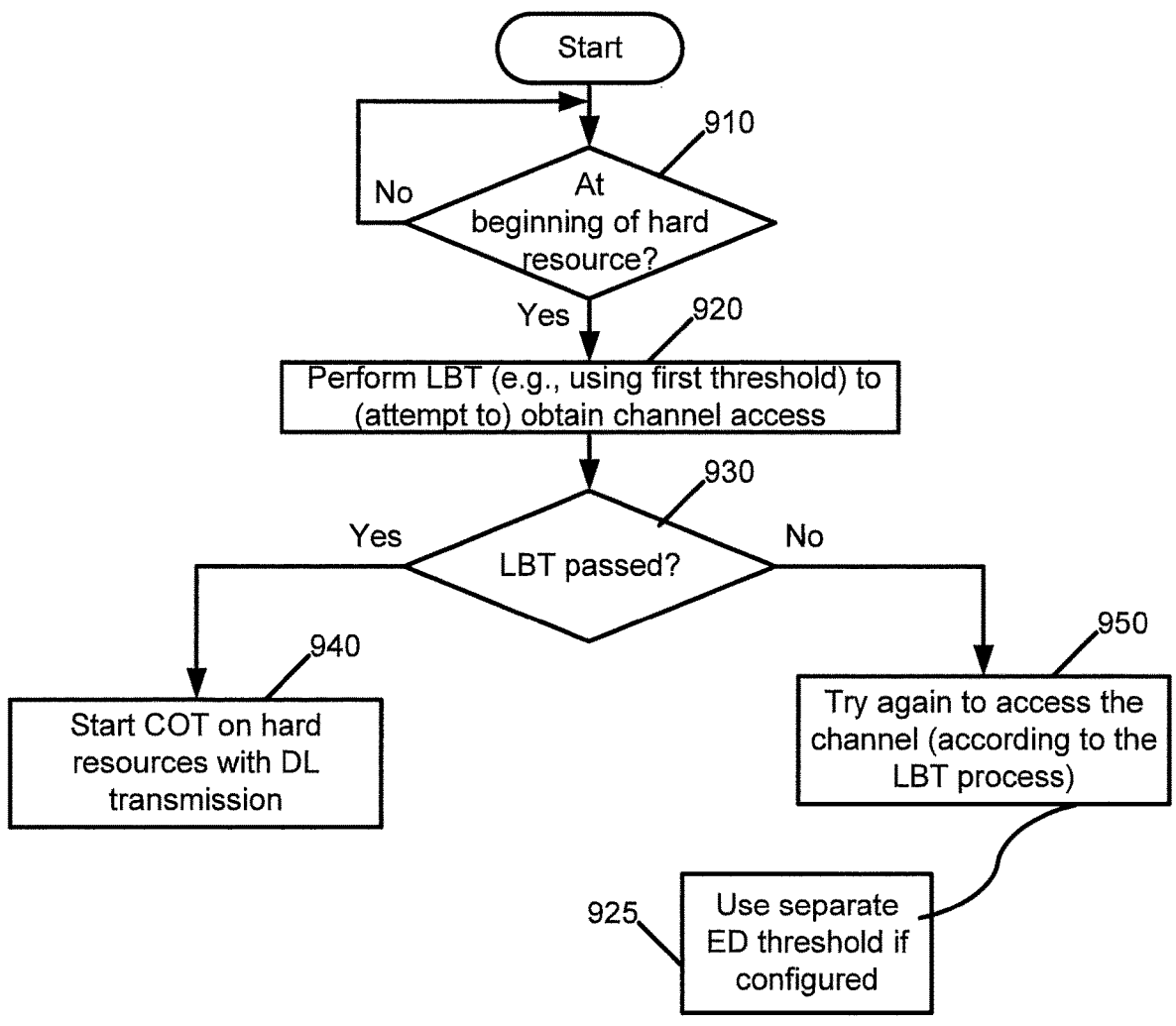
FIG. 9 is a logic flow diagram for using hard time resources for an IAB node, in accordance with an exemplary embodiment.

Concerning use of a set of hard resources (e.g., symbols/ slots), FIG. 9 is a logic flow diagram for using hard time resources for an IAB node, in accordance with an exemplary embodiment. This figure also illustrates the operation of an exemplary method or methods, a result of execution of computer program instructions embodied on a computer readable memory, functions performed by logic implemented in hardware, and/or interconnected means for performing functions in accordance with exemplary embodiments.

In FIG. 9, the other IAB node (e.g., parent node) (e.g., DU) performs LBT to obtain channel access. The flow starts in block 910, when the IAB node 170 determines if it is at a beginning of a hard resource. See block 910. If not (block 910=No), the IAB node waits. If so (block 910=Yes), the IAB node 170 performs LBT to (attempt to) obtain channel access in block 920. This LBT uses a first threshold. If LBT is passed (block 930=Yes), the other IAB node 170 starts COT with DL transmission on hard resources in block 940. Meanwhile, if LBT is not passed (block 930=No), the IAB node (DU) may try again to access the channel (according to the LBT process, which may be performed multiple times within the hard resources). See block 950. If a separate ED threshold is configured, that is used in the determined LBT instances (overlapping with the DL starting symbols on soft resources of the other link). See block 925. The ED threshold is applied on the specific LBT time instances (if a lower threshold is configured/predetermined), and this is lower in value than the value of the first threshold used in the LBT of block 920. In more detail, a lower threshold means that smaller interference is blocking the transmission (i.e. it is more "friendly" towards the primary usage/hard node. That is, the target of configuring the lower threshold is to ensure that the usage of hard resources is reliably detected. In an exemplary embodiment, the configuration of the lower threshold depends on the outcome of measurements on DL detectability discussed below.

Figure 10:
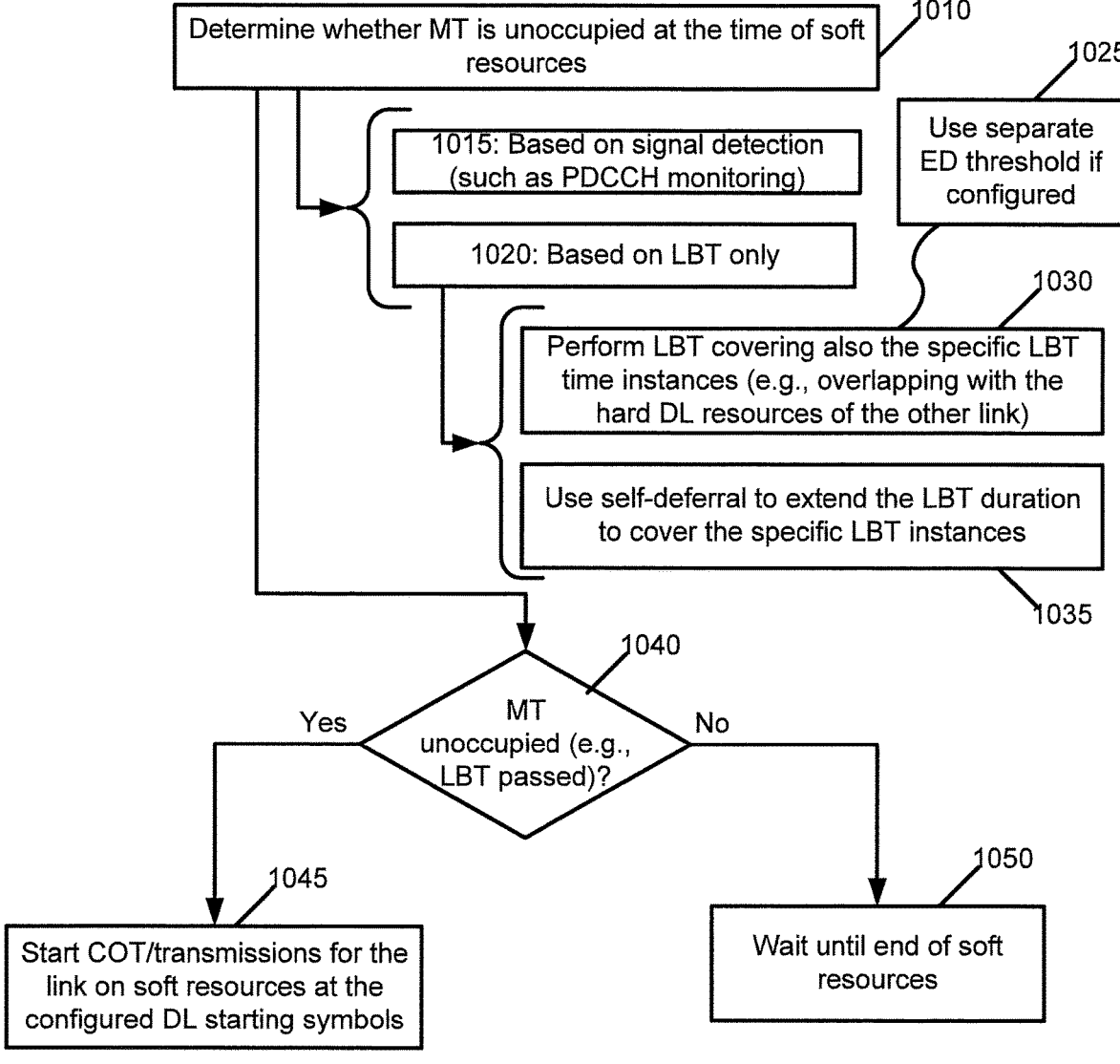
FIG. 10 is a logic flow diagram for using soft time resources for an IAB node, in accordance with an exemplary embodiment.

Concerning use of a set of soft resources (e.g., symbols/slots), FIG. 10 is a logic flow diagram for using soft time resources for an IAB node, in accordance with an exemplary embodiment. This figure also illustrates the operation of an exemplary method or methods, a result of execution of computer program instructions embodied on a computer readable memory, functions performed by logic implemented in hardware, and/or interconnected means for performing functions in accordance with exemplary embodiments.

At a beginning use of soft resources (e.g., symbols/slots), the IAB node may determine that the (parent) backhaul resources of the IAB Node MT are unoccupied at the time of soft resources. See block 1010. The IAB Node MT is scheduled by the parent (donor) node. Depending on the parent node's scheduling decisions, IAB Node MT may be occupied or unoccupied. Block 1010 may be performed based on signal detection (such as PDCCH monitoring). See block 1015. For example, if IAB Node MT does not detect PDCCH during the N first slots of the other link, it may consider that the other link is unoccupied. Another option is that the MT link is considered to be unoccupied based on LBT only. See block 1020. The IAB node may also perform (see block 1030) LBT covering also the specific LBT time instances (e.g., overlapping with the hard DL resources of the other link). The node may use self-deferral to extend the LBT duration to cover the specific LBT instances. See block 1035. LBT self-deferral means that channel occupancy measurements are temporarily stopped (e.g., suspended), after which they are continued with at least one LBT measurement. That is, the node may temporally stop channel occupancy measurements or clear channel assessments (CCAs) for a while before continuing with channel occupancy measurements or CCAs to extend the LBT duration.

The IAB node may apply a separate (e.g., lower) ED threshold on the specific LBT time instances (if lower threshold is configured/predetermined), see block 1025. If the MT is unoccupied (e.g., LBT is passed) (block 1040=Yes), the IAB node DU may start COT/transmissions for the link on access soft resources at the configured DL starting symbols. See block 1045. If the MT is occupied (e.g., LBT is not passed or a signal is detected in block 1015, such that block 1040=No), the IAB node waits until the end of the soft resources in block 1050.

It is noted that the SNs with both soft and hard resources should perform both FIGS. 9 and 10. For some SNs, this entails alternating in time similarly to the hard/soft resources alternating in time.

Now that an overview has been provided, additional details are provided. These details include information on a setup phase, a resource configuration, operation, and further notes.

First, there is a setup phase. For the setup phase, before the configuration of specific soft time resources, measurements on DL detectability may be carried out. On those measurements it may be determined which IAB node's DL transmissions an IAB node can detect. That is, it is determined whether a scheduling node can detect its child node's DU DL. Based on measurements, configurations for soft time resources are determined: it is required in an exemplary embodiment that the scheduling node of soft time resources can detect the DL (e.g., energy) of the scheduling node for the simultaneous hard time resources, and the scheduling node for the hard time resources can detect the DL (e.g., energy) of the scheduling node of the simultaneous soft time resources. This energy detection may be energy detection corresponding or similar to LBT energy detection in CCA. It does not need to be exactly the same as LBT energy detection, however. If necessary to ensure the detection, lower ED threshold (as stated above) may be configured for specific LBT time instances.

Figures 11A, 11B:
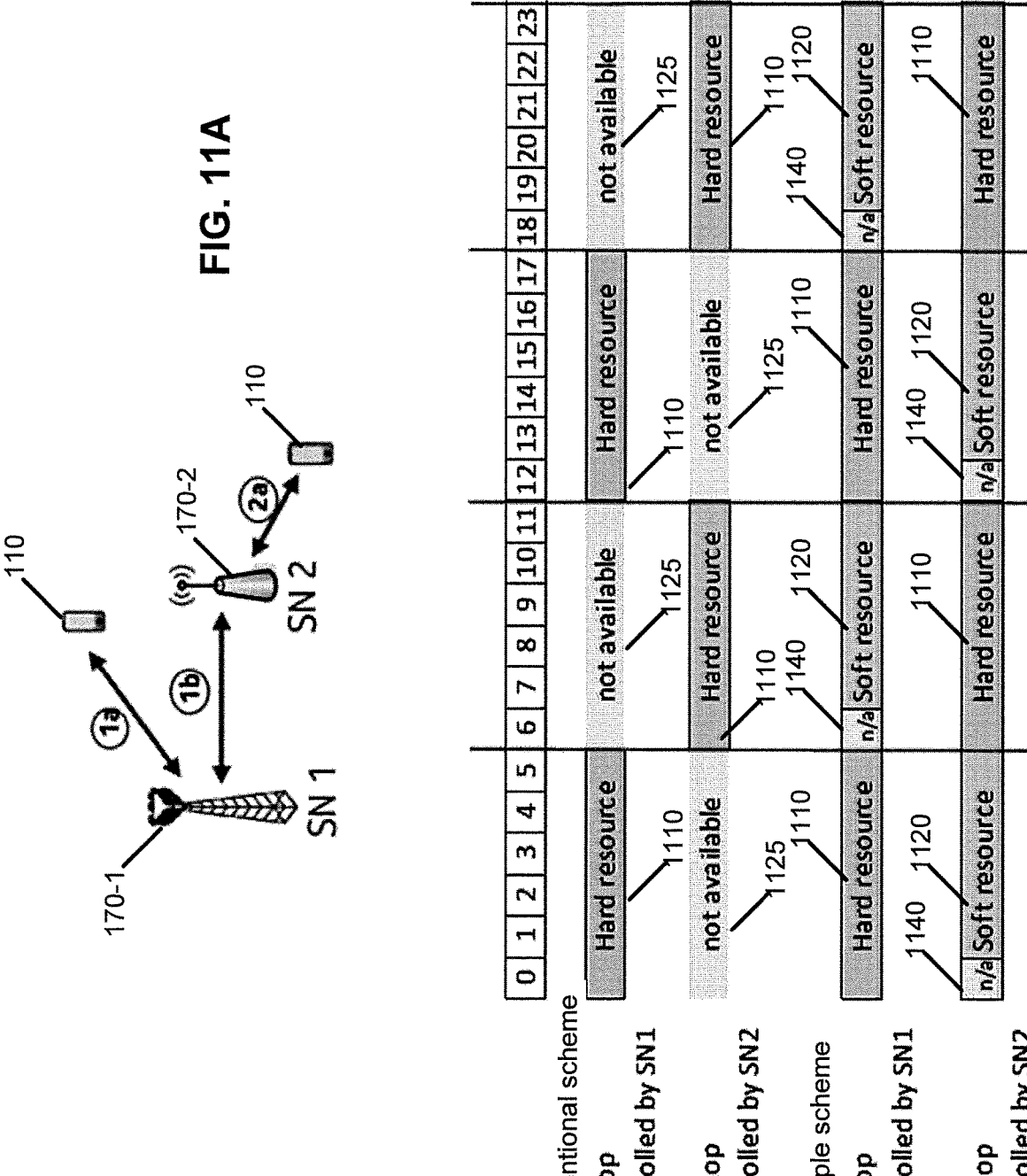
FIG. 11A is an illustration of a two-hop system in accordance with an exemplary embodiment.
FIG. 11B is an example of resource configurations for different links for the system in FIG. 11A, for both a conventional scheme and an example scheme in accordance with an exemplary embodiment.
Figures 12A, 12B:
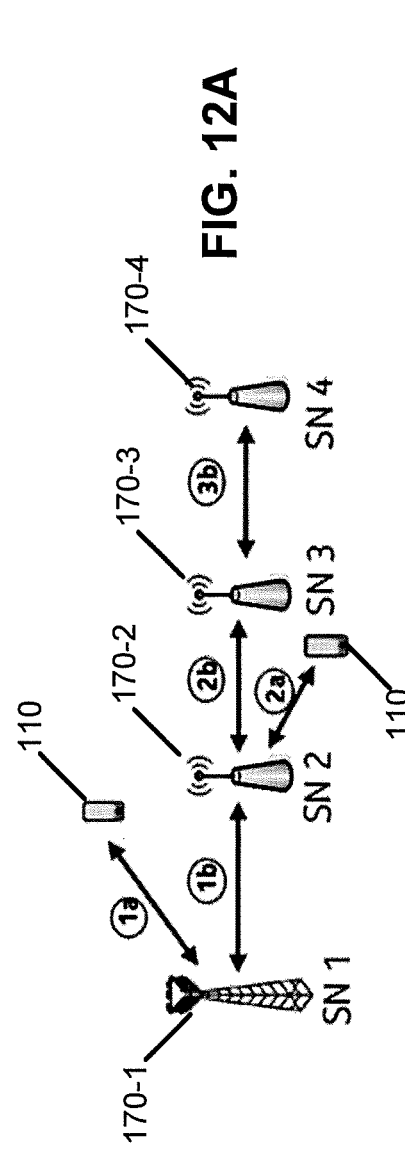
FIG. 12A is an illustration of a three-hop system in accordance with an exemplary embodiment.
FIG. 12B is an example of resource configurations for different links for the system in FIG. 12A, in accordance with an exemplary embodiment.
Figures 13A, 13B:
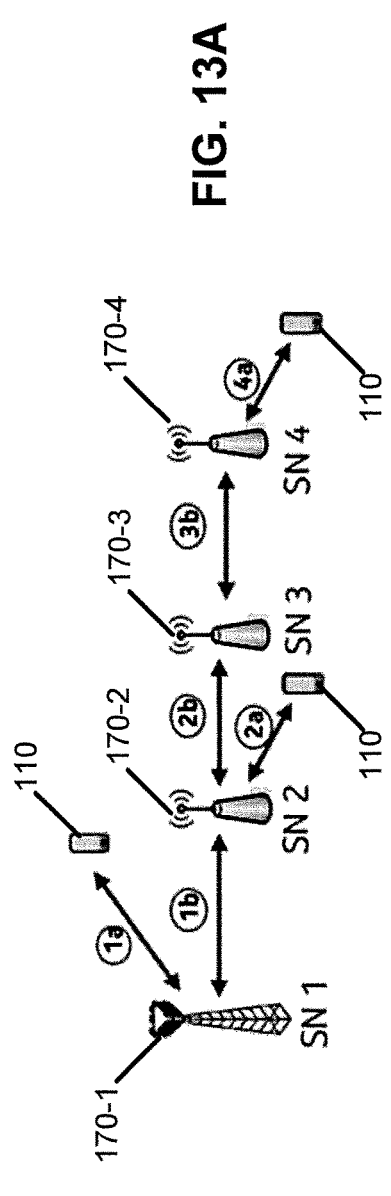
FIG. 13A is an illustration of a four-hop system in accordance with an exemplary embodiment.
FIG. 13B is an example of resource configurations for different links for the system in FIG. 13A, in accordance with an exemplary embodiment.

Concerning resource configuration, resource configurations are illustrated in FIGS. 11B, 12B, and 13B for the cases of two, three, and four hops, respectively. The corresponding two-hop, three-hop, and four-hop systems are illustrated in FIGS. 11A, 12A, and 13A, respectively. In FIGS. 11B, 12B, and 13B, the hard resources are labeled with reference number 1110, the soft resources are labeled with reference number 1120, and the times when the resources are not available (NA) are labeled with reference number 1125.

Figure 14:
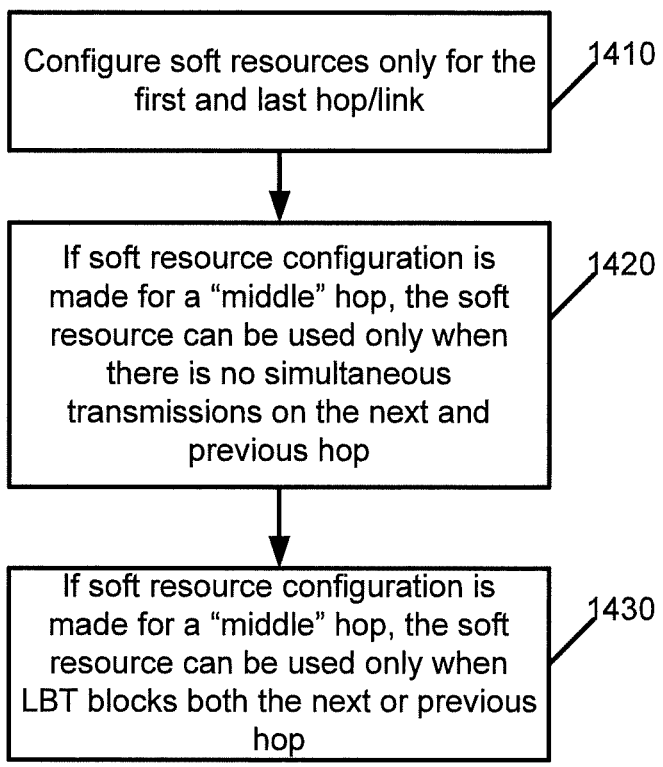
FIG. 14 is a logic flow diagram for implementing certain rules for soft resources for a system having multiple access and backhaul links, in accordance with an exemplary embodiment.

In FIGS. 11B, 12B, and 13B, the soft resources 1120 are configured as illustrated by FIG. 14, which is a logic flow diagram for implementing certain rules for soft resources for a system having multiple access and backhaul links. In particular, for some of the examples herein, soft resources are configured only for the first and last hop/link. See block 1410. Note that this is merely exemplary and other options are possible (e.g., as in (2) below). There are certain resources 1140 marked as not available (n/a), which are described in more detail below.

1) In the case of a first or last hop, the soft resource configuration can be used when LBT blocks the next or previous hop. See block 1420.

2) If soft resource configuration is made for a "middle" hop, the soft resource can be used only when there are no simultaneous transmissions on the next and previous hops, which is not that likely. See block 1430.

This limitation is not present in the case of two hops. The case of two hops is expected to be the most frequent case.

In FIG. 11B, this compares the first and second hops controlled by SN 1 and SN2, respectively, for the conventional scheme (top two rows) and an example scheme (bottom two rows). It can be seen that there were many times when resources were not available 1125 in the conventional scheme, whereas the example scheme has soft resources 1120 available for the same time periods as when the resources were not available 1125 in the conventional scheme. Note that at the beginning of the set of slots for soft resources 1120 is a n/a (not available) time resource, a slot in these examples.

In FIG. 12B, the first hop (controlled by SN 1 170-1) and last (third) hop (controlled by SN 3 170-3) are assigned both hard and soft resources in an alternating fashion, e.g., hard resource 1110 then soft resource 1120. As a point of terminology, the "first hop" covers 1b (in this example), while the "second hop" covers both 2a and 2b (with subsequent hops covering both a and b). The middle, second hop (controlled by SN 2 170-2) has no available 1125 resources and hard resources 1110, also assigned in an alternating fashion. The hard resources 1110 for the second SN are (e.g., substantially) aligned in time with the soft resources 1110 with the first and third SNs. Similarly, the resources that are not available 1125 for the SN 2 are (e.g., substantially) aligned in time with the hard resources 1110 of the first and third SNs.

Figure 12C:
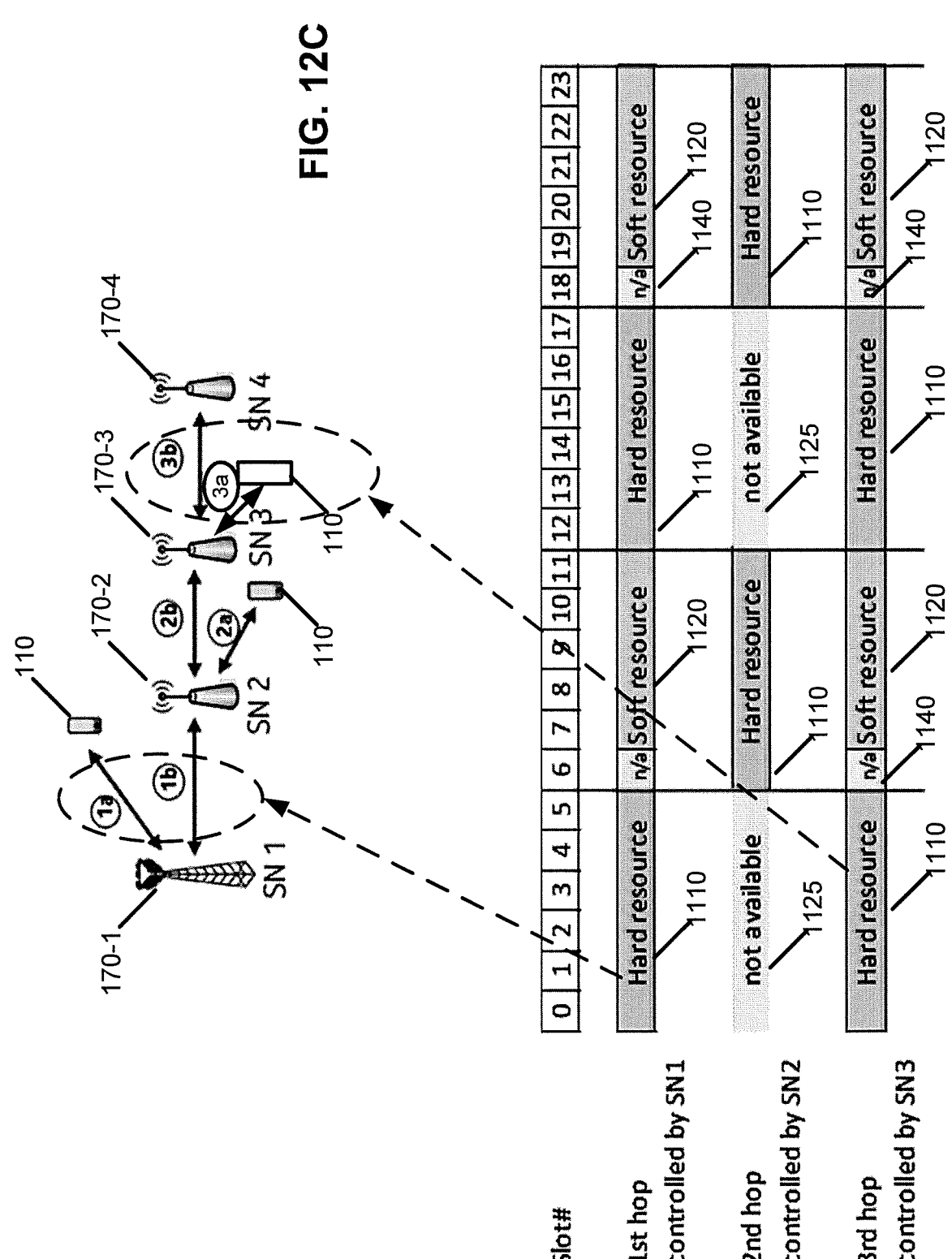
FIG. 12C is a visualization of potential resource usage in an exemplary embodiment for slots 0-5 of FIGS. 12A and 12B.

FIG. 12C is a visualization of potential resource usage in an exemplary embodiment for slots 0-5 of FIGS. 12A and 12B. In this example, the SN 3 170-3 is illustrated with a UE 110 and a possible 3a access link. The SN 1 170-1 has potential access to the hard resource 1110 (including one or both of 1a and 1b) for the first ($1^{st}$) hop for slots 0-5, and the SN 3 170-3 has potential access to the hard resource 1110 (including one or both of 3a and 3b) for the third ($3^{rd}$) hop for slots 0-5. Meanwhile, the resources for the second (2nd) hop are not available for slots 0-5.

Figure 12D:
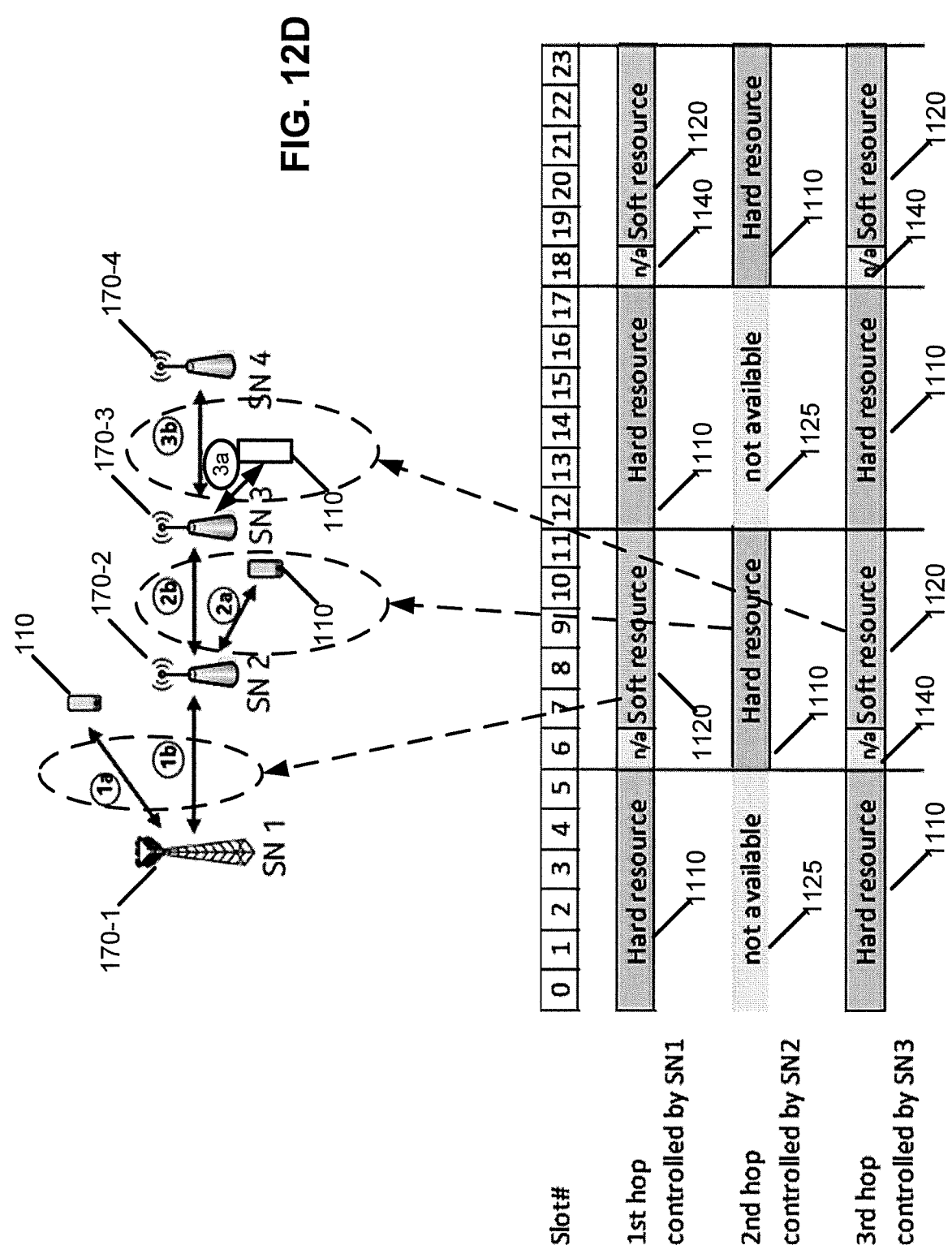
FIG. 12D is a visualization of potential resource usage in an exemplary embodiment for slots 6-11 of FIGS. 12A and 12B.

FIG. 12D is a visualization of potential resource usage in an exemplary embodiment for slots 6-11 of FIGS. 12A and 12B. In this example, the SN 3 170-3 is illustrated with a UE 110 and a possible 3a access link. The SN 1 170-1 has potential access to the soft resource 1120 (including one or both of 1a and 1b) for the first ($1^{st}$) hop for slots 7-11, and the SN 3 170-3 has potential access to the soft resource 1120 (including one or both of 3a and 3b) for the third ($3^{rd}$) hop for slots 7-11. Meanwhile, SN 2 170-2 has potential access to the hard resource 1110 (including one or both of 2a and 2b) for the second hop for slots 6-11.

In FIG. 13B, the first hop (controlled by SN 1 170-1) and last (third) hop (controlled by SN 3 170-3) are assigned both hard and soft resources in an alternating fashion, e.g., hard resource 1110 then soft resource 1120. The middle, second hop (controlled by SN 2 170-2) has no resources available 1125 and hard resources 1110, also assigned in an alternating fashion. The middle, third hop (controlled by SN 3 170-3) has hard resources 1100 and no resources available 1125, also assigned in an alternating fashion. The hard resources 1110 for the second SN are (e.g., substantially) aligned in time with the soft resources 1110 with the first hop. Similarly, the resources that are not available 1125 for the SN 2 are (e.g., substantially) aligned in time with the hard resources 1110 of the first SN. The hard resources 1110 for the third SN are (e.g., substantially) aligned in time with the soft resources 1110 with the fourth hop. Similarly, the resources that are not available 1125 for the SN 3 are (e.g., substantially) aligned in time with the hard resources 1110 of the fourth SN.

For FIGS. 11B, 12B, and 13B, one example is that first ones of the multiple network nodes 170 can relate to hop 2n+1 and the second ones of the multiple network nodes 170 can relate to hop 2n, n≥0. Another example is that the first ones of the multiple network nodes 170 relate to hop 2n and the second ones of the multiple network nodes relate to hop 2n+1, n≥0.

Figure 15:
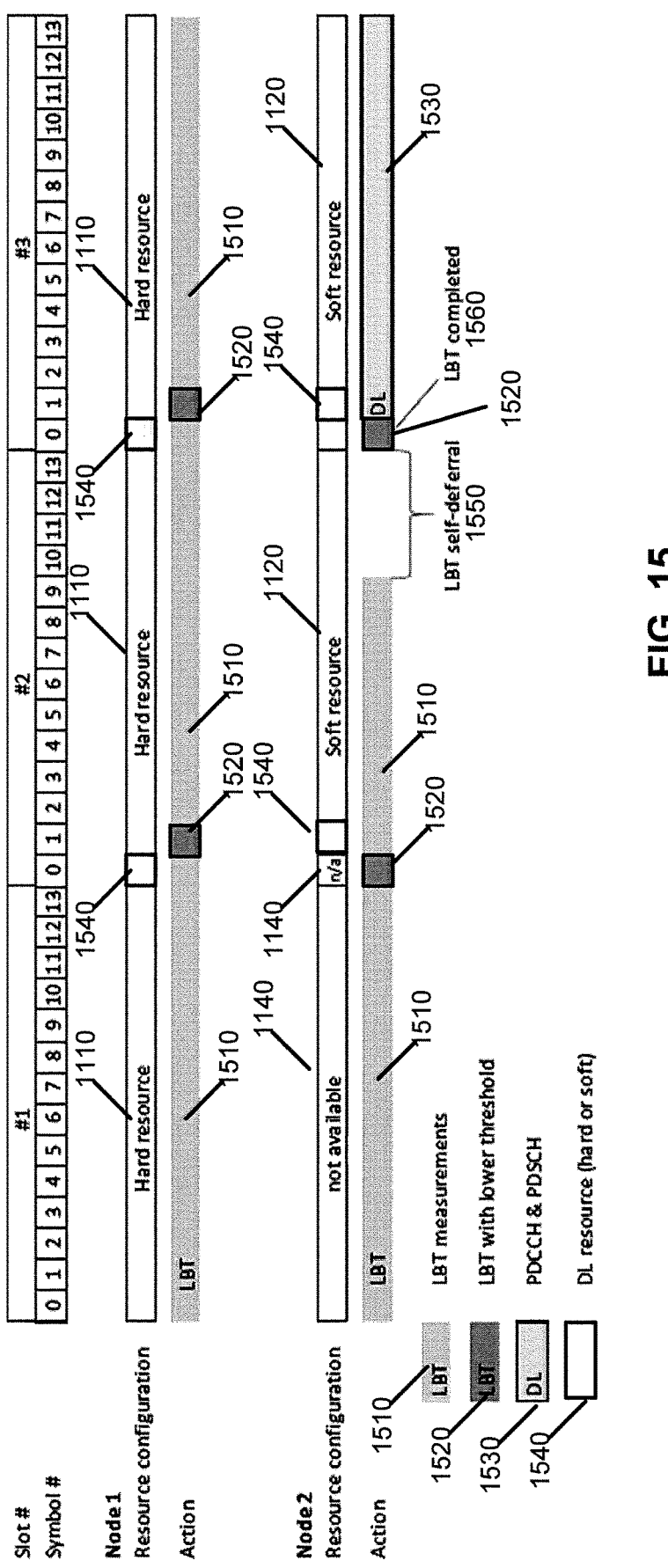
FIG. 15 is an illustration of operation of multiple scheduling nodes, in accordance with an exemplary embodiment.

With respect to operation, the operation of two nodes is illustrated in FIG. 15. This shows a Node 1 with a resource configuration of three hard resources over three slots, were each slot is 14 symbols. Node 1 is any SN with hard resources in these slots. For example, if taking slots 0-2 in FIG. 11B, Node 1 would be SN 1. This also shows a Node 2 with a resource configuration of resources not available 1125 for the first slot, and two sets of soft resources 1120 for slots two and three. Periods are shown for LBT measurements 1510, and also LBT measurements 1520 with lower thresholds as previously described. The DL 1530 is also illustrated, which could be PDCCH and/or PDSCH. Also, DL resources 1540, which could be either hard resources 1110 or soft resources 1120, are illustrated.

From the start of hard time resources 1110 for a link, the node 1 (scheduling for a first link) performs LBT to obtain channel access but finds the channel occupied. At the same time, node 2 (scheduling for a second link) performs LBT prior to the symbol where the use of soft resources can be started (e.g., in the reference 1140) and determines the occupancy of MT link. Note that reference 1140 in this example has a time duration of about a symbol instead of a slot as in previous figures. This is configurable based on different implementations. Before fully completing LBT (e.g., before reaching zero on the CCA counter) the node 2 starts self-deferral 1550. In self-deferral, node 2 temporarily suspends channel occupancy measurements of the LBT procedure. Node 2 can complete LBT procedure only on specified time instances, and this may require extending LBT procedure in time, e.g., when CCA counter would reach zero before the specified time instance. This can be done by self-deferral. That is, Node 2 can complete LBT procedure only on a specified time instance to ensure that Node 1 and Node 2 do not access channel simultaneously. This is achieved by allowing Node 2 to access channel only right after a symbol (specified time instance) on which Node 1 has DL resource configured. If Node 1 would gain access to channel, it would transmit DL on 1540, and Node 2 LBT procedure would detect that in 1520, hence, preventing Node 2 to transmit on channel simultaneously with Node 1. Node 2 also performs LBT on the specified time instances with a lower threshold (to detect DL of node 1). See 1520 in the third slot for node 2. The LBT is also completed at 1560. Node 2 determines the channel to be vacant (and determines the MT link, the backhaul link between Node 1 and Node 2, as unoccupied) and starts transmission (see DL 1530 for the third slot) at a configured starting symbol.

In further detail, the use of soft resources should not start before the first 1520, i.e., LBT time instance aligned with the DL resources 1540 of Node 1. Hence, it is an n/a resource preceding soft resource 1120. On other hand, the use of soft resource could start after the first 1520. In that case, it is not desirable to create a gap on the node 2 transmission due to n/a aligned with the $2^{nd}$ 1520 LBT time instance, so there is no 1140 before the soft resource 1120 in the third slot for Node 2. It is additionally noted that Node 2 does not have to perform LBT for each slot. Instead, Node 2 will perform LBT once for soft resources and then just keep transmitting. In the simplest set up, it would be enough to have 1540 and 1520 for Node 1 and Node 2 (+1140 n/a) in the second slot. The 1520 and 1540 in the third slot are for the case where neither Node 1 (in slot 1 or slot 2) nor Node 2 (in slot 2) has obtained channel access. In other words, references 1520 & 1540 in the third slot provide the Node 1/Node 2 another opportunity to try to obtain channel access.

In this example, the only transmission is DL 1530. This is an exemplary figure, and there may be more consecutive slots configured with soft/hard resources. Also, the LBT times in slots 1 and 2 may be shortened. The reference 1520 are the specified time instances with "LBT with lower threshold" which are (e.g., substantially) time-aligned with configured DL resources 1540. For instance, the LBT with lower threshold 1520 for Node 1 is aligned with the DL resources 1540 of the Node 2. The configured DL resources 1540 for the hard resources 1110 are the first symbol on which the Node 1 can perform transmission, if the LBT of 1510 is completed. The LBT with lower threshold 1520 for Node 2 is aligned with the DL resources 1540 of the Node 1. The configured DL resources 1540 for the soft resources 1120 are the first symbol on which the Node 2 can perform transmission, if the LBT of 1520 is completed 1560. In this example, only the LBT 1520 for the third slot completed 1560.

It should be noted that when the soft resources are used in a previous (e.g., first or n-1:th) hop, very conservative MCS should be used in the previous hop, as the intended receiver (i.e., the scheduling node configured with hard resources for the current hop or, e.g., second or n:th hop) is likely suffering from interference, which is also blocking the LBT for the current hop. Interference may come, e.g., from equipment not at all connected to this network (e.g., WiFi) As an example, an SN 1 would use soft resources over both link la and lb. This would interfere with SN 2, but as shown in FIG. 15, SN 2 (as Node 2) will (try to) access the channel on soft resources only after the SN 1 (Node 1) has failed on channel access on hard resources. Further, only DL resources may be scheduled on the soft resources of the previous hop (as the IAB MT of the hop cannot access the channel).

Further notes include the following. Instead of energy detection LBT on the specific LBT instances, a scheduling node may perform PDCCH or reference signal monitoring for detecting the DL of the other node. This is an attractive solution especially when the other node to be detected is the parent node. The scheduling node may continue COT started on soft resources on following hard resources as long as the maximum COT is not exceeded.

Figure 16:
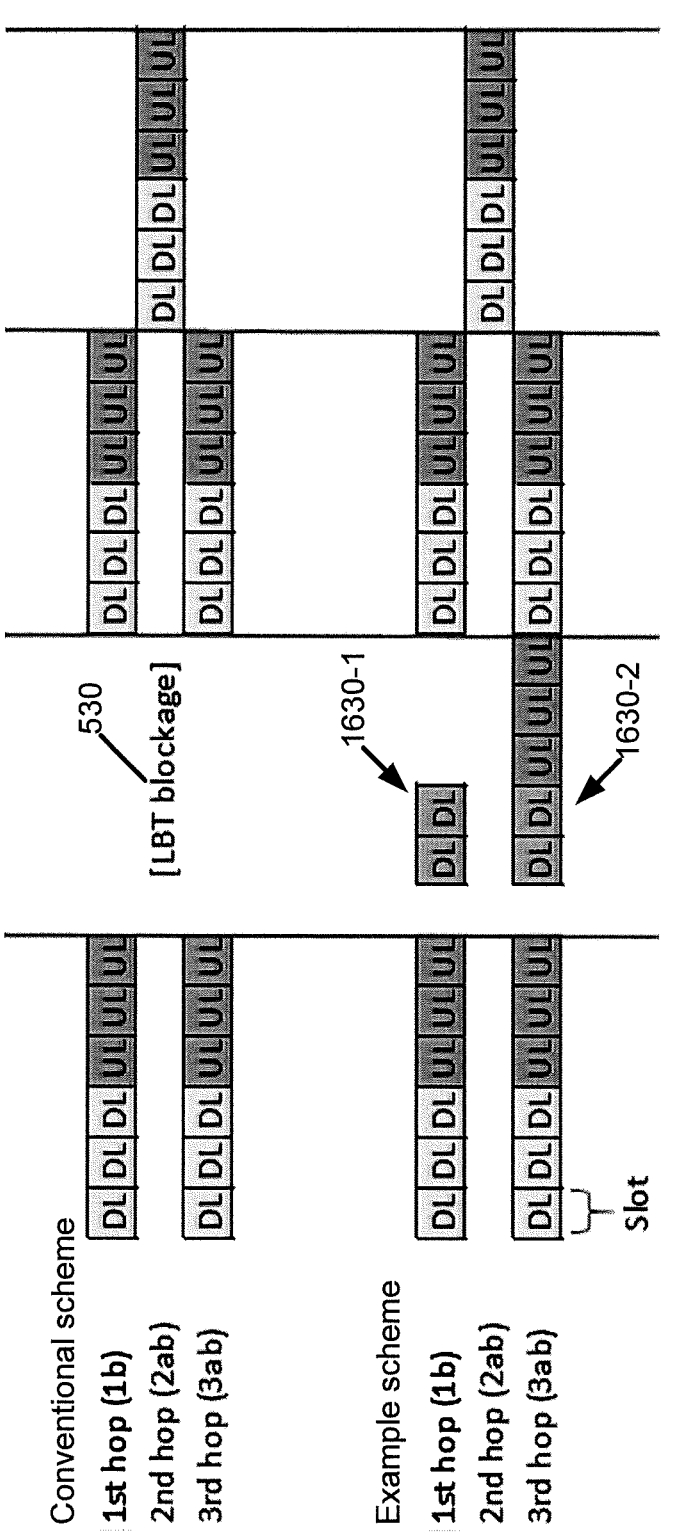
FIG. 16 is an illustration of resource usage in case of LBT blockage for a conventional scheme and a proposed exemplary arrangement.

Additionally, the more efficient use of resources achieved with the arrangement over the prior art is illustrated on FIG. 16. FIG. 16 is an illustration of resource usage in case of LBT blockage for a conventional scheme and proposed exemplary arrangement. In this figure, LBT blocks 530 the channel access for the second hop in the conventional scheme. More specifically, in the conventional scheme, the resources allocated for second (2nd) hop (tab) get blocked by LBT. Those resources cannot be used by first (1st) hop or third (3rd) hop, as those are not allocated to them—as there is no mechanism to avoid simultaneous transmission on first (or third hop) and second hop.

With the arrangements described above (illustrated under the "example scheme"), the resources can be used for the first and third hop. There are two DL resources in reference 1630-1 that are used by the first hop and two DL and three UL resources in reference 1630-2 that are used by the third hop. That is, resource allocation rules herein allow for the first and third hops to use the hard resources allocated for the second hop when the second hop LBT blocks the resources, while rules ensure that the hops do not transmit simultaneously (e.g., especially the location of specific time instances with low threshold LBT of one hop being aligned with DL resources of another hop, and possibility to start Tx only right after a specific time instance).

For instance, if one compares the example scheme of FIG. 16 with FIG. 12B, if the second hop in hard resource 1110 is blocked by LBT, one or both of the first or third hops can transmit on a soft resource 1120. Referring also to FIG. 15, each of the first and third hops use, e.g., the rules illustrated in FIG. 15, where the Node 1 (as the second hop) is block but the first and third hops (each as a Node 2) can perform DL transmissions 1530 after an LBT with a lower threshold 1520 completes 1560.

Without in any way limiting the scope, interpretation, or application of the claims appearing below, a technical effect and advantage of one or more of the example embodiments disclosed herein is that more efficient overall use of resources is achieved. Another technical effect of one or more of the example embodiments disclosed herein is that only modest changes to the current IAB resource usage rules are required. Furthermore, the new rules further utilize existing LBT mechanisms, reducing the implementation cost even further.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
5G fifth generation
5GC 5G core network
AMF access and mobility management function
BH Backhaul CAT Category
CCA Clear Channel Assessment
COT Channel Occupancy Time
CN core network
CU central unit
DCI Downlink Control Information
DgNB Donor gNB
DL Downlink (from network toward UE
DU distributed unit
ED Energy Detection
e.i.r.p. effective isotropic radiated power
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDM Frequency division multiplexing
gNB (or gNodeB) base station for 5G/NR, i.e., a node providing NR user plane and control plane protocol terminations towards the UE, and connected via the NG interface to the 5GC
IAB Integrated access and backhaul
I/F interface
IoT Internet of things
LAA Licensed Assisted Access
LBT Listen before talk
LoRa long-range
LTE long term evolution
MAC medium access control
MCS Modulation and Coding Scheme
MME mobility management entity
MT Mobile Termination or mobile terminated
NA or n/a not available
ng or NG next generation
ng-eNB or NG-eNB next generation eNB
NR new radio
NR-U New Radio Unlicensed band
N/W or NW network
PDCCH Physical Downlink Control Channel
PDCP packet data convergence protocol
PDSCH physical downlink shared channel
PHY physical layer
RAN radio access network
Rel release
RLC radio link control
RRH remote radio head
RRC radio resource control
RU radio unit
Rx receiver
SDAP service data adaptation protocol
SDM Space division multiplexing
SFI Slot Format Indication
SGW serving gateway
SI Study Item
SMF session management function
SN Scheduling Node
SR Scheduling request
TDD Time Division Duplexing
TDM Time division multiplexing
TS technical specification
Tx transmitter UE user equipment (e.g., a wireless, typically mobile device)
UL uplink (from network toward UE)
UPF user plane function

What is claimed is:

1. An apparatus configured to operate as a second network node among a plurality of network nodes forming a multi-hop topology in a wireless network, the apparatus comprising:

at least one processor; and at least one non-transitory memory storing instructions that, when executed by the at least one processor, cause the apparatus to perform operations comprising:

access, in the wireless network, a configuration of first time resources and a configuration of second time resources for communications over a backhaul using one or more unlicensed spectrum bands, wherein:

the first time resources are allocated to a first network node of the plurality of network nodes for a first channel access attempt, the first time resources comprising designated downlink resources corresponding to downlink starting symbols of the first network node, the second time resources are allocated to the apparatus and overlap with the first time resources, the second time resources comprise resources for channel occupancy measurements performed within a time period of the designated downlink resources, the second time resources are configured with a first rule that permits the apparatus to perform a second channel access attempt on the one or more unlicensed spectrum bands, and the first rule permits the second channel access attempt based on a determination that the first channel access attempt has failed;

determining whether the first channel access attempt has failed by performing the channel occupancy measurements within the time period of the designated downlink resources, wherein performing the channel occupancy measurements comprises:

performing a listen-before-talk (LBT) procedure on the one or more unlicensed spectrum bands, wherein the LBT procedure comprises:

initiating a first channel assessment of the LBT procedure during a not-available time period preceding the second time resources, wherein the not-available time period corresponds to a time period aligned with a start of downlink transmission of the designated downlink resources;

performing a final channel assessment of the LBT procedure at a specified time instance that is aligned with the designated downlink resources, the final channel assessment being performed at a second threshold value lower than the first threshold value; and preventing simultaneous channel access attempts by the apparatus and the first network node by temporarily suspending the LBT procedure via self-deferral to delay the final channel assessment until the specified time instance;

based on a successful completion of the LBT procedure, determine that the first access attempt has failed; and based on determining the first channel access attempt has failed:

perform the second channel access attempt on the one or more unlicensed spectrum bands during the second time resources; and based on the second channel access attempt obtaining channel access:

initiate a channel occupancy time (COT) by beginning transmission on the second time resources;

communicate over the backhaul on the second time resources; and continue the COT into next-occurring first time resources without exceeding a maximum channel occupancy time.

2. The apparatus of claim 1, wherein the first time resources and the second time resources are configured to alternate in time between the first network node and the second network node.

3. The apparatus of claim 1, wherein a duration of the resources for the channel occupancy measurements is less than or equal to a duration of the designated downlink resources.

4. The apparatus of claim 1, wherein the first time resources and the second time resources are further configured for communications with a user equipment.

5. The apparatus of claim 1, wherein the apparatus comprises one of the following:

a base station;

a distributed unit;

an integrated access and backhaul node;

a distributed unit of an integrated access and backhaul donor node; or a distributed unit of the integrated access and backhaul node.

\*   \*   \*   \*   \*